(12) United States Patent
Lee et al.

(10) Patent No.: US 9,292,287 B2
(45) Date of Patent: Mar. 22, 2016

(54) METHOD OF SCHEDULING LOOPS FOR PROCESSOR HAVING A PLURALITY OF FUNCTIONAL UNITS

(71) Applicant: SAMSUNG ELECTRONICS CO., LTD., Suwon-si (KR)

(72) Inventors: Yeon Bok Lee, Seoul (KR); Young Hwan Park, Yongin-si (KR); Ho Yang, Hwaseong-si (KR); Keshava Prasad, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/330,675

(22) Filed: Jul. 14, 2014

(65) Prior Publication Data

US 2015/0149747 A1    May 28, 2015

(30) Foreign Application Priority Data

Nov. 25, 2013 (KR) .................. 10-2013-0143552

(51) Int. Cl.
 G06F 9/45     (2006.01)
 G06F 9/30     (2006.01)

(52) U.S. Cl.
 CPC .......... G06F 9/30065 (2013.01); G06F 8/4452 (2013.01)

(58) Field of Classification Search
 CPC ...... G06F 8/452; G06F 9/30065; G06F 9/325
 USPC ................... 717/151–161; 712/241
 See application file for complete search history.

(56) References Cited

U.S. PATENT DOCUMENTS

| | | | |
|---|---|---|---|
| 5,491,823 A * | 2/1996 | Ruttenberg | 717/161 |
| 5,958,048 A * | 9/1999 | Babaian et al. | 712/241 |
| 6,230,317 B1 * | 5/2001 | Wu | 717/161 |
| 8,725,486 B2 * | 5/2014 | Oh et al. | 703/21 |
| 8,745,608 B2 * | 6/2014 | Kim et al. | 717/161 |
| 8,869,129 B2 * | 10/2014 | Oh et al. | 717/161 |
| 2002/0133813 A1 * | 9/2002 | Ostanevich | 717/150 |
| 2004/0083468 A1 * | 4/2004 | Ogawa et al. | 717/151 |
| 2005/0039167 A1 * | 2/2005 | Fernandes et al. | 717/116 |
| 2005/0055674 A1 * | 3/2005 | Shidla et al. | 717/131 |
| 2005/0283772 A1 | 12/2005 | Muthukumar et al. | |
| 2009/0070552 A1 | 3/2009 | Kanstein et al. | |
| 2009/0119490 A1 * | 5/2009 | Oh et al. | 712/214 |
| 2010/0185839 A1 * | 7/2010 | Oh et al. | 712/241 |
| 2010/0199069 A1 * | 8/2010 | Kim et al. | 712/30 |
| 2011/0067014 A1 * | 3/2011 | Song et al. | 717/149 |
| 2011/0246170 A1 * | 10/2011 | Oh et al. | 703/22 |
| 2013/0151815 A1 * | 6/2013 | Suh et al. | 712/42 |

OTHER PUBLICATIONS

Park et al., "Modulo Graph Embedding: Mapping Applications onto Coarse-Grained Reconfigurable Architectures," Oct. 2006, ACM, p. 136-146.*

(Continued)

*Primary Examiner* — Qing Chen
(74) *Attorney, Agent, or Firm* — NSIP Law

(57) ABSTRACT

Provided is a loop scheduling method including scheduling a first loop using execution units, and scheduling a second loop using execution units available as a result of the scheduling of the first loop. An n-th loop (n>2) may be scheduled using a result of scheduling an (n−1)-th loop, similar to the (n−1)-th loop. The first loop may be a higher priority loop than the second loop.

34 Claims, 20 Drawing Sheets

(56) References Cited

OTHER PUBLICATIONS

Hatanaka et al., "A Modulo Scheduling Algorithm for a Coarse-Grain Reconfigurable Array Template," 2007, IEEE.*
Park et al., "Edge-centric Modulo Scheduling for Coarse-Grained Reconfigurable Architectures," Oct. 2008, ACM, p. 166- 176.*
Oh et al., "Recurrence Cycle Aware Modulo Scheduling for Coarse-Grained Reconfigurable Architectures," Jun. 2009, ACM, p. 21-30.*
Kim et al., "Improving Performance of Nested Loops on Reconfigurable Array Processors," Jan. 2012, ACM, p. 1-23.*
"Coarse-Grained Reconfigurable Architecture," <http://cccp.eecs.umich.edu/research/cgra.php>, May 11, 2012, p. 1-5.*
Vander Aa, Tom, et al. "A multi-threaded coarse-grained array processor for wireless baseband." *Application Specific Processors (SASP), Jun. 2011 IEEE 9th Symposium on.* IEEE, 2011.
Extended European Search Report issued on Mar. 20, 2015 in counterpart European Application No. 14193967.8 (7 pages, in English).
Lam, Yuet Ming, et al. "Multiloop parallelisation using unrolling and fission." *International Journal of Reconfigurable Computing* 2010 (2010): 1. (12 pages, in English).

* cited by examiner

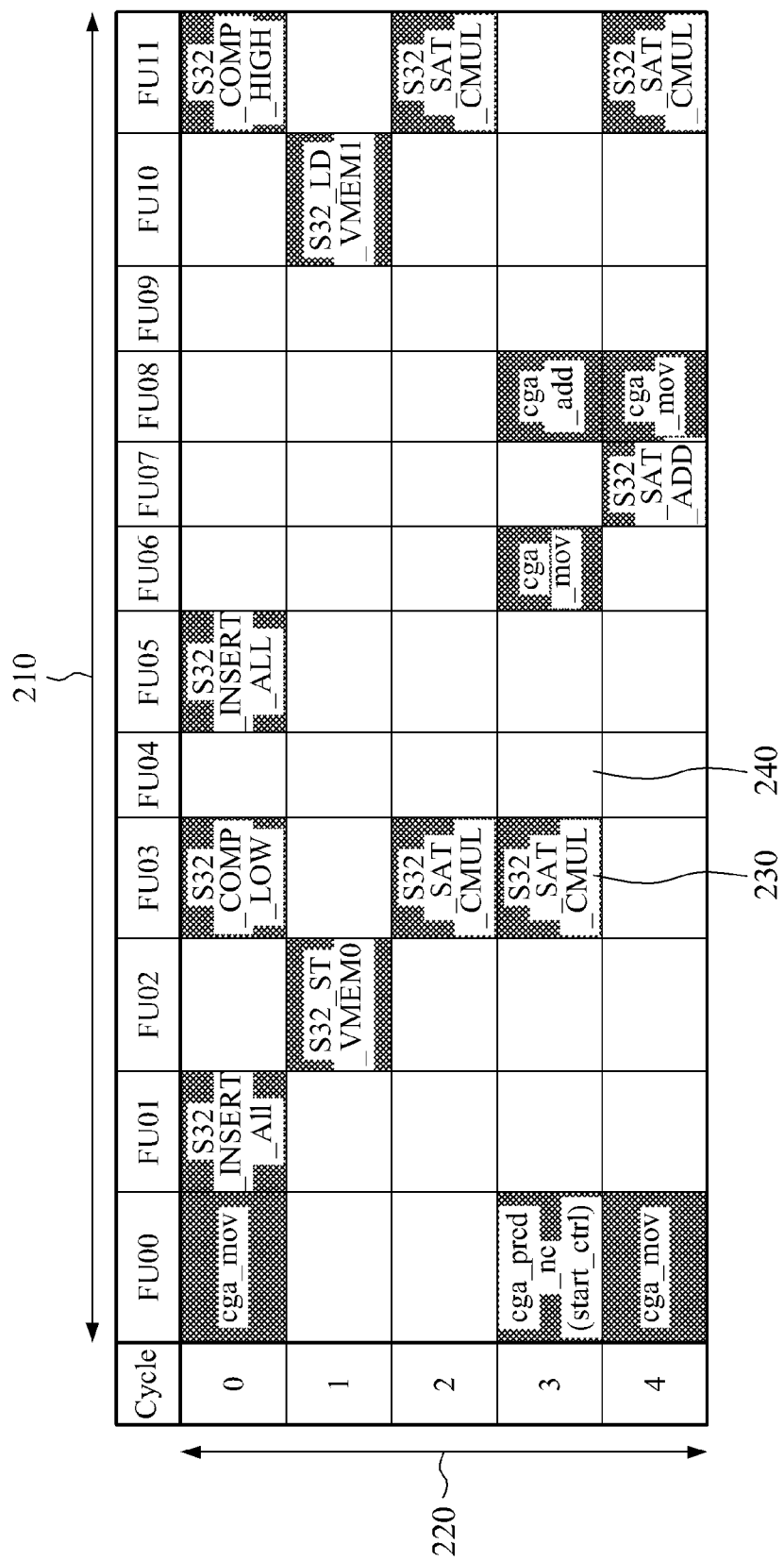

FIG. 2B

| Cycle | FU00 | FU01 | FU02 | FU03 | FU04 | FU05 | FU06 | FU07 | FU08 | FU09 | FU10 | FU11 |
|---|---|---|---|---|---|---|---|---|---|---|---|---|
| 0 | cga_mov | S32_INSERT_All | | S32_COMP_LOW | | S32_INSERT_ALL | | S32_SAT_CMUL | | S32_insert_all | S32_LD_VMEM1 | S32_COMP_HIGH |
| 1 | | | S32_ST_VMEM0 | | cga_pred_ne | | cga_mov | S32_SAT_ADD | | | S32_LD_VMEM1 | S32_SAT_CMUL |
| 2 | | | S32_ST_VMEM0 | S32_SAT_CMUL | cga_mov | | | S32_COMP_HIGH | | | | S32_SAT_CMUL |
| 3 | cga_pred_nc (start_ctrl) | | | S32_SAT_CMUL | cga_add | S32_insert_all | cga_mov | S32_COMP_LOW | cga_add | | | S32_SAT_CMUL |
| 4 | cga_mov | | | S32_SAT_CMUL | | | cga_mov | S32_SAT_ADD | cga_mov | | | S32_SAT_CCMUL |

250

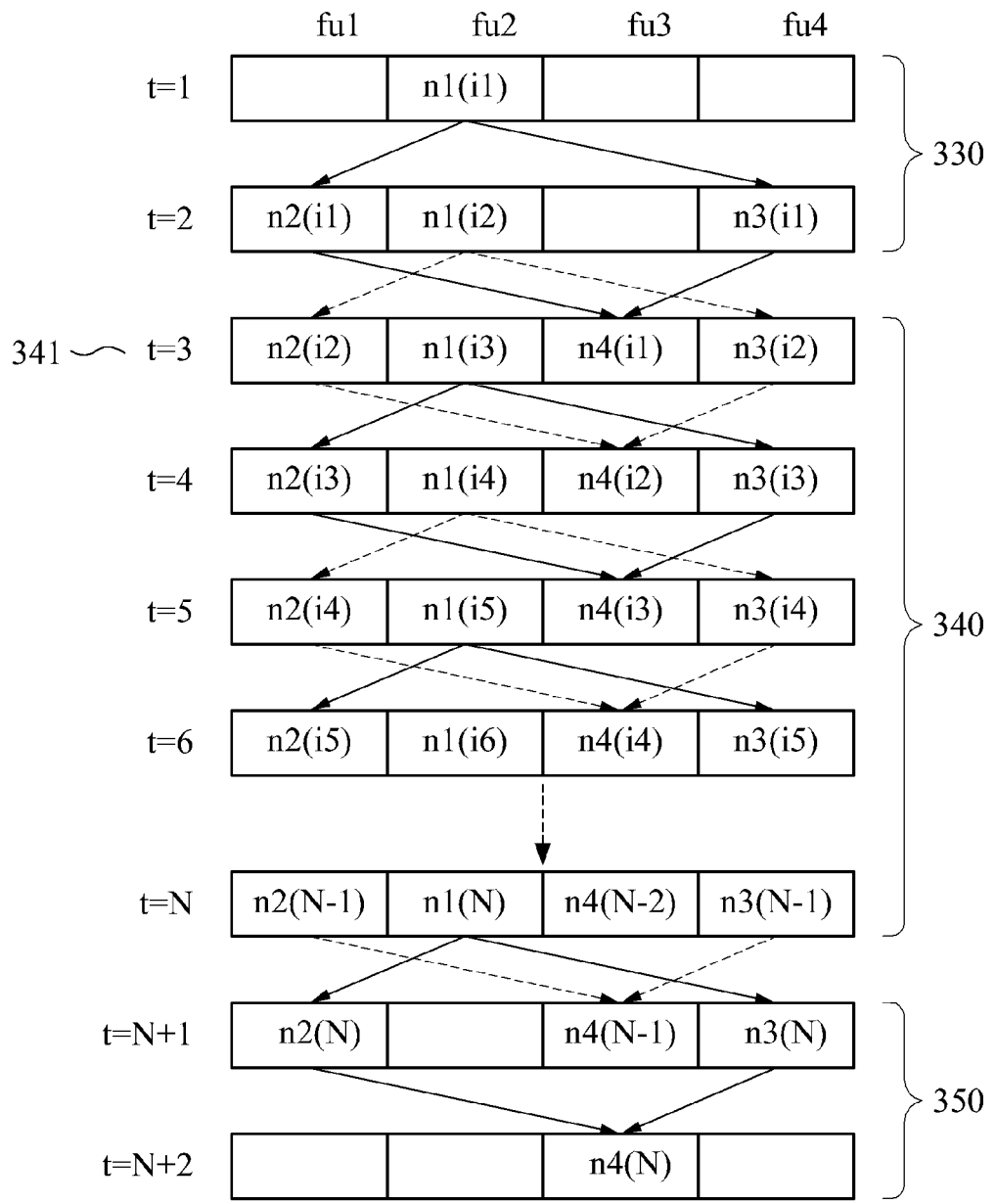

FIG. 4C

| Cycle | SC1 | SC2 | SC3 | PU1 | PU2 | PU3 | MM1 | MM2 | VEC1 | VEC2 | VEC3 | VEC4 |
|---|---|---|---|---|---|---|---|---|---|---|---|---|
| 1 | s1 |  |  |  |  |  | m2 | m4 |  | v2 |  |  |
| 2 |  | s2 |  |  |  |  |  | m5 |  | v3 |  | v4 |
| 3 |  |  | s3 | p1 |  |  | m3 |  |  |  |  | v5 |
| 4 |  |  |  |  |  | p2 | m1 | m6 |  |  |  |  |

| Cycle | SC1 | SC2 | SC3 | PU1 | PU2 | PU3 | MM1 | MM2 | VEC1 | VEC2 | VEC3 | VEC4 |
|---|---|---|---|---|---|---|---|---|---|---|---|---|
| 1 | s1 |    | s3 |   |   |   |   |   |   |   |   |   |
| 2 |    | s2 | s4 |   |   |   |   |   |   |   |   |   |

| Cycle | SC1 | SC2 | SC3 | PU1 | PU2 | PU3 | MM1 | MM2 | VEC1 | VEC2 | VEC3 | VEC4 |
|---|---|---|---|---|---|---|---|---|---|---|---|---|
| 1 | s1(1) | | | | | | m2(1) | m4(1) | | v2(1) | | |
| 2 | s1(2) | s2(1) | s3(2) | | | | | m5(1) | | v3(1) | | v4(1) |
| 3 | | | s3(1) | p1(1) | | | m3(1) | | | | | v5(1) |
| 4 | | s2(2) | s4(2) | | | p2(1) | m1(1) | m6(1) | | | | |

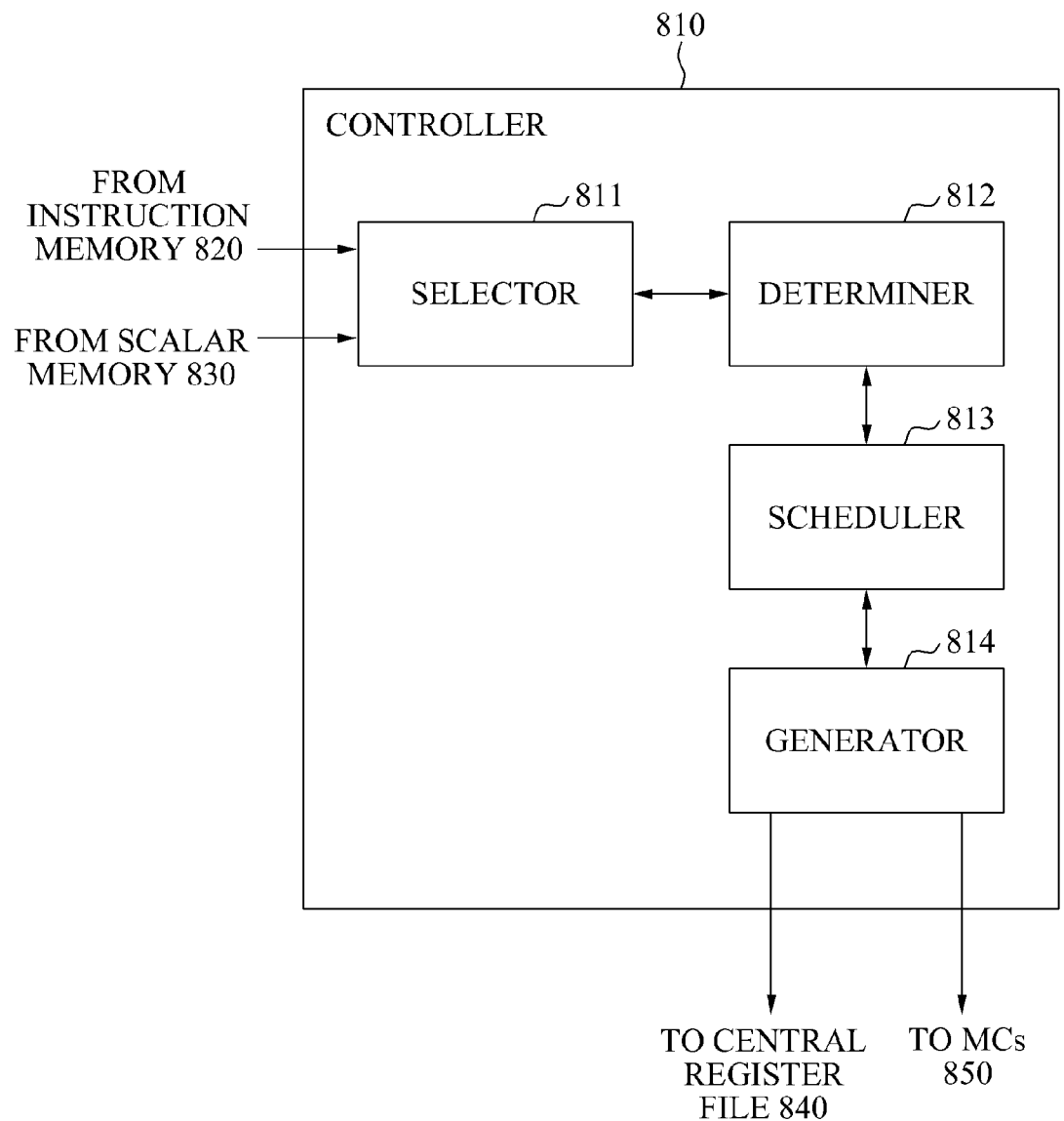

METHOD OF SCHEDULING LOOPS FOR PROCESSOR HAVING A PLURALITY OF FUNCTIONAL UNITS

CROSS-REFERENCE TO RELATED APPLICATIONS

This application claims the benefit under 35 U.S.C. §119 (a) of Korean Patent Application No. 10-2013-0143552 filed on Nov. 25, 2013, in the Korean Intellectual Property Office, the entire disclosure of which is incorporated herein by reference for all purposes.

BACKGROUND

1. Field

The following description relates to a loop scheduling method.

2. Description of Related Art

A very long instruction word (VLIW) processor or a coarse-grained reconfigurable array (CGRA) processor uses a plurality of functional units (FUs). To allow the FUs to communicate with one another, the FUs may be connected to one another through data paths.

In choosing configurations of the data paths and the FUs in the processor, a number of combinations may be possible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a loop scheduling method includes scheduling a higher priority loop using execution units, and scheduling a lower priority loop using execution units available as a result of the scheduling of the higher priority loop.

The scheduling of the higher priority loop may include scheduling a highest priority loop using the execution units.

The scheduling of the lower priority loop may include scheduling at least a portion of the lower priority loop using execution units yet to be assigned to the higher priority loop, in cycles for which the higher priority loop is scheduled.

The scheduling of the higher priority loop may include selecting independent loops from among loops included in source code, and determining priorities of the selected loops.

A priority of the higher priority loop may be higher than a priority of the lower priority loop, and a priority of a loop may be calculated based on at least one of an iteration count of the loop and a number of cycles for a single iteration of the loop.

The scheduling of the lower priority loop may include assigning instructions to the available execution units in cycles for which the higher priority loop is scheduled, based on a data dependency among the instructions included in the lower priority loop.

The scheduling of the lower priority loop may include determining an execution unit to be used to schedule the lower priority loop, and verifying whether the determined execution unit is available in a cycle for which the higher priority loop is scheduled.

The scheduling of the higher priority loop may include assigning instructions to the execution units in cycles, based on a data dependency among the instructions included in a highest priority loop.

The method may further include unrolling a result of the scheduling of the higher priority loop in response to the lower priority loop not being scheduled using the available execution units, and scheduling the lower priority loop using execution units available as the unrolled result of the scheduling.

The unrolling may include determining whether the result of the scheduling of the higher priority loop is to be unrolled, based on at least one of a threshold value for an unrolling count and a threshold value for a number of cycles of the unrolled result of the scheduling.

The scheduling of the lower priority loop may include restricting, using predication guarding, an execution of the lower priority loop after the lower priority loop is iterated in response to an iteration count of the higher priority loop being greater than an iteration count of the lower priority loop.

The method may further include scheduling the lower priority loop to iterate a remaining portion of the lower priority loop after the higher priority loop is iterated in response to an iteration count of the higher priority loop being less than an iteration count of the lower priority loop.

The method may further include scheduling an instruction to store intermediate data of the lower priority loop after the at least one higher priority loop is iterated.

The execution units may be included in a coarse-grained reconfigurable array (CGRA) processor or a very long instruction word (VLIW) processor.

The execution units may include a scalar functional unit (FU) configured to process a scalar data operation, a pack/unpack FU configured to process a conversion between scalar data and vector data, a vector load/store FU configured to process loading and storing of vector data, and a vector FU configured to process an operation on vector data.

In another general aspect, a loop scheduling method includes scheduling a first loop using execution units, and scheduling a second loop using execution units available as a result of the scheduling of the first loop.

The scheduling of the second loop may include scheduling at least a portion of the second loop using execution units yet to be assigned to the first loop in cycles for which the first loop is scheduled.

The method may further include selecting two independent loops from among loops included in source code, and determining a selected loop that enables a number of the available execution units to increase to be the first loop, and determining a remaining selected loop to be the second loop.

A priority of the first loop may be higher than a priority of the second loop, and a priority of a loop may be calculated based on at least one of an iteration count of the loop and a number of cycles for a single iteration of the loop.

The scheduling of the second loop may include assigning instructions to the available execution units in cycles for which the first loop is scheduled, based on a data dependency among the instructions included in the second loop.

The scheduling of the second loop may include determining an execution unit to be used to schedule the second loop, and verifying whether the determined execution unit is available in a cycle for which the second loop is scheduled.

The scheduling of the first loop may include assigning instructions to the execution units in cycles, based on a data dependency among the instructions included in the first loop.

The method may further include unrolling a result of the scheduling of the first loop in response to the second loop not being scheduled using the available execution units, and scheduling the second loop using execution units available as the unrolled result of the scheduling.

The unrolling may include determining whether the result of the scheduling of the first loop is to be unrolled, based on at least one of a threshold value for an unrolling count and a threshold value for a number of cycles of the unrolled result of the scheduling.

The scheduling of the second loop may include restricting, using predication guarding, an execution of the second loop after the second loop is iterated in response to an iteration count of the first loop being greater than an iteration count of the second loop.

The method may further include scheduling the second loop to iterate a remaining portion of the second loop after the first loop is iterated, in response to an iteration count of the first loop being less than an iteration count of the second loop.

The method may further include scheduling an instruction to store intermediate data of the second loop after the first loop is iterated.

In another general aspect, there is provided a non-transitory computer-readable storage medium storing a program for loop scheduling, the program comprising instructions for causing a computer to perform the first method presented above.

In one general aspect, a controller includes a selector configured to select independent loops from among loops included in source code, a detector configured to determine, among the selected loops, a first loop having a higher priority and a second loop having a lower priority, a scheduler configured to schedule the first loop using execution units and to schedule the second loop using execution units available as a result of the scheduling of the first loop, and a generator configured to generate an object code comprising the result of the scheduling of the first loop and a result of the scheduling of the second loop.

The scheduling of the second loop may include scheduling at least a portion of the second loop using execution units yet to be assigned to the first loop, in cycles for which the first loop is scheduled.

The determining may include calculating a priority of the first loop and a priority of the second loop based on at least one of an iteration count of the loop and a number of cycles for a single iteration of the loop.

The scheduling the second loop may include mapping a data flow graph (DFG) of the second loop to execution units available in cycles for which the second loop is scheduled.

The scheduling the second loop may include determining an execution unit to be used to schedule the second loop, and verifying whether the determined execution unit is available in a cycle for which the second loop is scheduled.

The scheduling the first loop may include scheduling a data flow graph (DFG) of the first loop to the execution units in cycles.

The scheduler may be further configured to unroll a result of the scheduling of the second loop in response to the second loop not being scheduled using the available execution units, and to schedule the second loop using execution units available as the unrolled result of the scheduling.

The scheduling the second loop may include restricting, using predication guarding, an execution of the second loop after the second loop is iterated in a case in which an iteration count of the second loop is greater than an iteration count of the second loop.

The scheduler may be further configured to schedule the second loop to iterate a remaining portion of the second loop in response to an iteration count of the second loop being less than an iteration count of the second loop.

In another general aspect, a loop scheduling method includes scheduling higher priority loops using execution units, and scheduling a lower priority loop using execution units available as a result of the scheduling of the higher priority loops.

The scheduling of the higher priority loops may include scheduling a highest priority loop using the execution units.

The scheduling of the lower priority loop may include scheduling at least a portion of the lower priority loop using execution units yet to be assigned to the higher priority loops, in cycles for which the higher priority loop are scheduled.

The scheduling of the higher priority loops may include selecting independent loops from among loops included in source code, and determining priorities of the selected loops.

The scheduling of the lower priority loop may include assigning instructions to the available execution units in cycles for which the higher priority loops are scheduled, based on a data dependency among the instructions included in the lower priority loop.

The scheduling of the lower priority loop may include determining an execution unit to be used to schedule the lower priority loop, and verifying whether the determined execution unit is available in a cycle for which the higher priority loops are scheduled.

The scheduling of the higher priority loops may include assigning instructions to the execution units in cycles, based on a data dependency among the instructions included in a highest priority loop.

Other features and aspects will be apparent from the following detailed description, the drawings, and the claims.

BRIEF DESCRIPTION OF THE DRAWINGS

FIGS. 2A and 2B illustrate examples of results of scheduling a first loop and a second loop, respectively.

FIGS. 3A and 3B illustrate examples of scheduling a single loop.

FIGS. 4A through 4F illustrate examples of scheduling a first loop and a second loop.

FIGS. 7, 8A through 8B, and 9 through 12 illustrate examples of an optimized target architecture.

Figure 1:
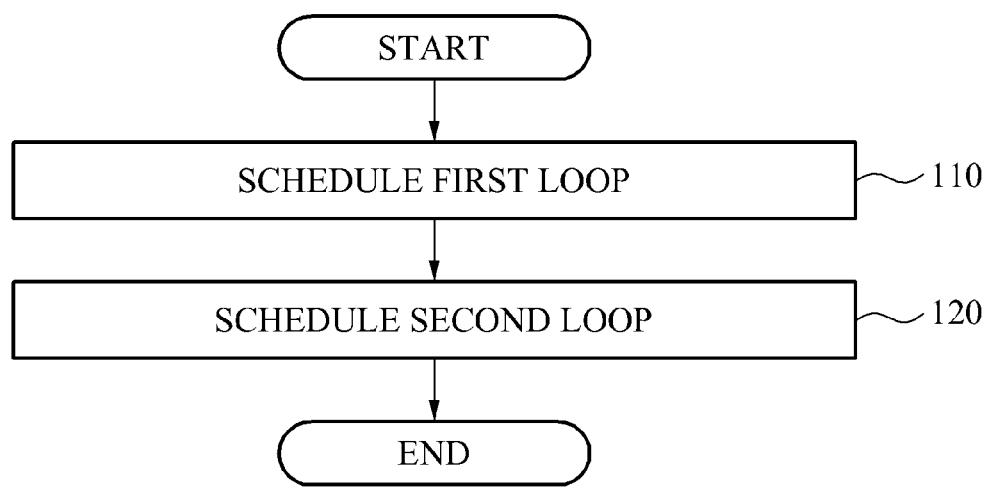
FIG. 1 is a flowchart illustrating an example of a loop scheduling method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

As a design for maximum performance, all of the FUs may be configured to process all instructions, and the data-paths may be configured to connect all of the FUs to one another. The data-path may have a broadest bit-width among vector data types supported by the processor.

FIG. 1 is a flowchart illustrating an example of a loop scheduling method.

Referring to FIG. 1, the loop scheduling method includes operation 110 of scheduling a first loop, and operation 120 of scheduling a second loop. For example, in operation 110, the first loop is scheduled using a plurality of execution units. An execution unit refers to a unit configured to execute instructions. In an example, an execution unit is a functional unit (FU) included in a very long instruction word (VLIW) processor or a coarse-grained reconfigurable array (CGRA) processor. In operation 110, a plurality of instructions included in the first loop are assigned to the plurality of execution units. The plurality of execution units are described further with reference to FIGS. 7 through 12. In this example, in operation 120, the second loop is scheduled using execution units, as discussed above, that are available after scheduling the first loop. Thus, in operation 120, a plurality of instructions included in the second loop are scheduled using execution units that are not in use after scheduling the first loop.

Examples are potentially applicable to a case of scheduling two loops and another case of scheduling at least three loops. For example, a first loop is scheduled by priority. After the first loop is scheduled by priority, in an example a second loop is scheduled using remaining hardware (HW) resources. In addition, a third loop is scheduled using HW resources remaining after scheduling the first loop and the second loop. Examples are also applicable to a case of scheduling at least four loops to be executed simultaneously. However, for ease of description, a example case of scheduling a first loop and a second loop is used an illustrative example.

Referring to the example of Table 1, a source code used for a radio kernel includes a plurality of loops, for example, loop1 and loop2. In this example, loop1 in the source code corresponds to the first loop scheduled in operation 110, and loop2 in the source code corresponds to the second loop scheduled in operation 120.

TABLE 1 source code

```
for(n=0; n<3; n++) {
    for(m=0; m<6; m++){
        Func1 (..){
            for( i=0; i<2 ; i++) {
                for( j=0; j<2; j++) {
                    loop1
                    loop2
                    ...
                }
            }
        }
    }
}
```

Referring to Table 2, loop1 includes a plurality of instructions in its loop body. In operation 110, loop1 is scheduled using a plurality of execution units. For example, referring to the example of FIG. 2A, the plurality of instructions included in loop1 are assigned to a plurality of execution units 210 in each cycle 220. Due to constraints of HW resources and a dependency among the instructions in loop1, in this example it is difficult to schedule all of the instructions in loop1 in parallel. In this example, execution units not in use are potentially present after scheduling the instructions in loop1. Thus, the execution units not in use are recited as NOP (No Operation) execution units. In the example of FIG. 2A, an execution unit FU03 corresponding to a filled block 230 processes an instruction S32_SAT_CMUL assigned to a corresponding cycle cycle3. However, an execution unit FU04 corresponding to an empty block 240 in FIG. 2A does not process any instruction in the corresponding cycle cycle3, and wastes an operation cycle without accomplishing any processing tasks.

TABLE 2 loop1

```
for(k=0; k < 22; k++) {
    cir=S32_LD_1(in, i);
    cir_power  = S32_SAT_CCMUL (cir, cir, 4);
    power_th   = S32_INSERT_ALL((npow*nc_thre));
    mask_high = S32_COMP_HIGH(cir_power, power_th);
    mask_low = S32_COMP_LOW(cir_power, power_th);
    cir_high = S32_SAT_CMUL(cir, mask_high, 0);
    cir_low = S32_SAT_CMUL(cir, mask_low, 0);
    noise_reduce_coef = S32_INSERT_ALL(nr_coef);
    cir_low_reduce = S32_SAT_CMUL(cir_low,
noise_reduce_coef, shift_bit);
    cir_nr = S32_SAT_ADD(cir_high, cir_low_reduce);
    S32_ST_0 (out, k, cir_nr);
}
```

In Table 2, S32_LD_1( ) is an instruction for a vector load operation. S32_SAT_CCMUL( ) is an instruction for a vector multiplication operation. S32_INSERT_ALL( ) is an instruction for a vector substitution operation. S32_COMP_HIGH( ) is an instruction for a vector higher bit comparison operation, and S32_COMP_LOW( ) is an instruction for a vector lower bit comparison operation. S32_SAT_CMUL( ) is an instruction for a vector multiplication operation, S32_SAT_ADD( ) is an instruction for a vector addition operation, and S32_ST_0( ) is an instruction for a vector store operation.

Referring to Table 3, loop2 includes a plurality of instructions in its loop body. As discussed above, in an example, in operation 120, loop2 is scheduled using execution units not in use after scheduling loop1. For example, referring to the example of FIG. 2B, the plurality of instructions included in loop2 are assigned to blocks remaining empty after scheduling loop1. By scheduling loop2, an instruction cga_add 250 for loop2 is assigned to the block 240 that was previously empty after scheduling loop1. Accordingly, an instruction level parallelism (ILP) increases, and a number of execution units not in use decrease. As such, performance of the processor increases. In addition, a number of operation cycles to be dissipated likely decreases, and a power consumption of the processor is potentially reduced.

TABLE 3 loop2

```
for(m=0; m < 5 ; m++) {
    cir = I_S32_LD_1( (unsigned int)in, m);
    cir_power = S32_SAT_CCMUL(cir, cir, 4);
```

TABLE 3-continued

```
loop2
        power_th = S32_INSERT_ALL( (npow * nc_thre) >> 4);
        mask_high = S32_COMP_HIGH(cir_power, power_th);
        mask_low = S32_COMP_LOW(cir_power, power_th);
        cir_high = S32_SAT_CMUL(cir, mask_high, 0);
        cir_low = S32_SAT_CMUL(cir, mask_low, 0);
        noise_reduce_coef = S32_INSERT_ALL(nr_coef);
        cir_low_reduce = S32_SAT_CMUL(cir_low,
noise_reduce_coef, shift_bit);
        cir_nr = S32_SAT_ADD(cir_high, cir_low_reduce);
        I_S32_ST_0 (out, i, cir_nr );
    }
```

In Table 3, I_S32_LD_1( ) is an instruction for a vector load operation. S32_SAT_CCMUL( ) is an instruction for a vector multiplication operation. S32_INSERT_ALL( ) is an instruction for a vector substitution operation. S32_COMP_HIGH( ) is an instruction for a vector higher bit comparison operation, and S32_COMP_LOW( ) is an instruction for a vector lower bit comparison operation. S32_SAT_CMUL( ) is an instruction for a vector multiplication operation, S32_SAT_ADD( ) is an instruction for a vector addition operation, and I_S32_ST_0( ) is an instruction for a vector store operation.

Hereinafter, an example of scheduling a single loop is described with respect to FIGS. 3A and 3B, and an example of scheduling a second loop using a result of scheduling a first loop is described further with respect to FIGS. 4A and 4B.

Figure 3A:
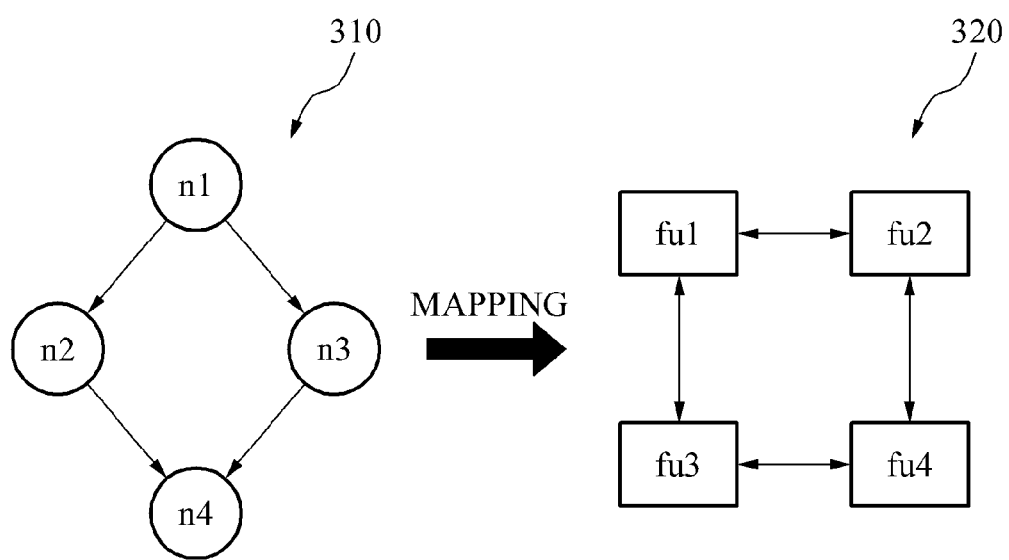

FIGS. 3A and 3B illustrate examples of scheduling a single loop. Before describing FIGS. 3A and 3B, a scheduling method employed by a scheduler according to an example is described. The scheduler schedules a loop to execute instructions included in the loop body of the loop in parallel. For example, the scheduler schedules a loop to execute iterations of an innermost loop in parallel. Hereinafter, the term "iteration" refers to an operation of executing a loop body one time at an arbitrary iteration point in time. Thus, the scheduler performs loop scheduling or compiling. The scheduler is also referred to as a loop scheduling apparatus, or a compiling apparatus, based on how it is implemented. In an example, the scheduler includes a hardware module, for example, a hardware accelerator (HWA).

In an example, the scheduler schedules a loop using a pipelining method. For example, the scheduler schedules a loop using a modulo scheduling method. A modulo scheduling method refers to a method of scheduling a loop to iteratively execute a loop body thereof at a regular interval. In an example, the regular interval includes a plurality of cycles. The regular interval refers to a difference between points in time at which two consecutive iterations in the loop are initiated. The regular interval may also be referred to as an initiation interval (II). For example, in the scheduling result of FIG. 2A and the scheduling result of FIG. 2B, the II corresponds to five (5) cycles, including cycles 0, 1, 2, 3, and 4.

Referring to the example of FIG. 3A, the scheduler maps a data flow graph (DFG) 310 of a loop to a target architecture 320. The scheduler determines an execution unit and a cycle in which a plurality of instructions included in the loop are to be executed. Additionally, the scheduler determines a data path along which data derived as a result of performing execution is to be transferred. Optionally, the scheduler considers a data association within an iteration, a data association among iterations, and constraints of HW resources. For example, the scheduler uses the DFG 310 and the target architecture 320 indicating data associations.

Referring to the DFG 310 of FIG. 3A, instructions n2 and n3 are executed after an instruction n1 is executed. An instruction n4 is executed after both instructions n2 and n3 are executed. Referring to the target architecture 320 of FIG. 3A, an execution unit fu1 exchanges data with an execution unit fu2 and an execution unit fu3. The execution unit fu2 exchanges data with the execution unit fu1 and an execution unit fu4. The execution unit fu3 exchanges data with the execution unit fu1 and the execution unit fu4. The execution unit fu4 exchanges data with the execution unit fu2 and the execution unit fu3. However, as illustrated in FIG. 3A the execution unit fu1 and the execution unit fu4 do not exchange data directly with each other.

Referring to the example of FIG. 3B, the scheduler assigns an instruction n1 to an execution unit fu2 in a first cycle when t=1, such that t denotes a time. Referring to the DFG 310, other instructions are not executed until the instruction n1 is executed. Thus, other instructions are not assigned in the first cycle t=1. In a second cycle t=2, instructions n2 and n3 are executed. Since the execution unit fu2 assigned the instruction n1 is able to exchange data with execution units fu1 and fu4, in this example the instruction n2 is assigned to the execution unit fu1 and the instruction n3 is assigned to the execution unit fu4. In a third cycle t=3, an instruction n4 is executed, and the instruction n4, in this example, is assigned to an execution unit fu3 that exchanges data with the execution units fu1 and fu4. Thus, available execution units are assigned instructions to execute by the scheduler based upon their ability to communicate with other functional units which are in communication with the available execution units.

When a data dependency among iterations is absent, a second iteration i2 is potentially initiated before a first iteration i1 is performed. It is necessary to wait for an iteration to conclude if there is a dependency, because if there is a dependency the second iteration i2 lacks information it needs to proceed. However, when there is no dependency, it is possible to proceed and process the iterations in parallel because in such a case they do not interact.

However, in an example, due to constraints of HW resources, the second iteration i2 is not initiated simultaneously with the first iteration i1, and is initiated in the second cycle t=2. The scheduler then schedules the second iteration i2, similar to the manner of scheduling of the first iteration i1. Hereinafter, n#(i##) refers to an instruction n# for a ##-th iteration, and # and ## denote particular instructions and iterations.

In the example of FIG. 3B, the scheduler assigns n1(i2) to the execution unit fu2 in the second cycle t=2. Referring to the DFG 310, other instructions are not executed until after the instruction n1 is executed. Thus, other instructions for the second iteration i2 are not assigned in the second cycle t=2. In the third cycle t=3, n2(i2) and n3(i2) are executed. Since the execution unit fu2 assigned n1 (i2) is capable of exchanging data with the execution units fu1 and fu4, n2(i2) is assigned to the execution unit fu1 and n3(i2) is assigned to the execution unit fu4. In a fourth cycle t=4, n4(i2) is executed, and n4(i2) is assigned to the execution unit fu3 that exchanges data with the execution units fu1 and fu4.

By scheduling the loop a number of times corresponding to an iteration count N of the loop, the scheduler obtains, in this example, the result of FIG. 3B. The result of FIG. 3B is classified into three time periods. A first time period 330 corresponds to a prologue, a time period in which early iterations of the loop are performed. A second time period 340 corresponds to a time period in which a kernel 341 is in a stabilized state. Identical instructions are potentially assigned to a plurality of execution units in the second time period 340. As illustrated in the example of FIG. 3B, in the third cycle t=3, the instruction n2 is assigned to the execution unit fu1, the instruction n1 is assigned to the execution unit fu2, the instruction n4 is assigned to the execution unit fu3, and the instruction n3 is assigned to the execution unit fu4. Similarly, in the fourth cycle t=4, the instruction n2 is assigned to the execution unit fu1, the instruction n1 is assigned to the execution unit fu2, the instruction n4 is assigned to the execution unit fu3, and the instruction n3 is assigned to the execution unit fu4. Up to an N-th cycle t=N in which the second time period 340 ends, identical instructions are assigned to a plurality of execution units. In an example, a kernel refers to an assigning result that is repeated in the second time period 340. A third time period 350 corresponds to an epilogue, a time period in which subsequent iterations of the loop are performed.

A number of cycles in which a kernel is formed is potentially substantially identical to the initiation interval described above. For example, in the second time period 340 of FIG. 3B, a cycle difference between a point in time at which a third iteration i3 is initiated and a point in time at which a fourth iteration i4 is initiated is a difference of 1 cycle and thus, the initiation interval is 1 cycle. Thus, in the second time period 340 of FIG. 3, the kernel 341 is formed in a single cycle.

In the example of FIG. 3B, all execution units are used in the kernel 341. However, due to any data dependencies among associations in source code and constraints of HW resources, as discussed, it is potentially difficult, in practice, to perform scheduling so that all execution units are utilized in every cycle. To address this issue, the scheduler schedules a portion of an iteration of another loop and the entire iteration of the other loop using HW resources not in use in each cycle as a result of scheduling a single loop. Thus, the scheduler provides technology that reduces a total number of execution cycles and power consumption. In addition, as described below further, the scheduler is potentially unable to schedule a second loop even using remaining HW resources available as a result of scheduling a first loop. In such an example, the scheduler extend a scheduling period substantially the same as an II by unrolling the result of scheduling the first loop, additionally obtaining available HW resources, and attempting to schedule the second loop. Based on a scheduling method, a schedule is determined at a compile time and thus, additional hardware resource usage is prevented.

FIGS. 4A through 4F illustrate examples of scheduling a first loop and a second loop.

Figure 4A:
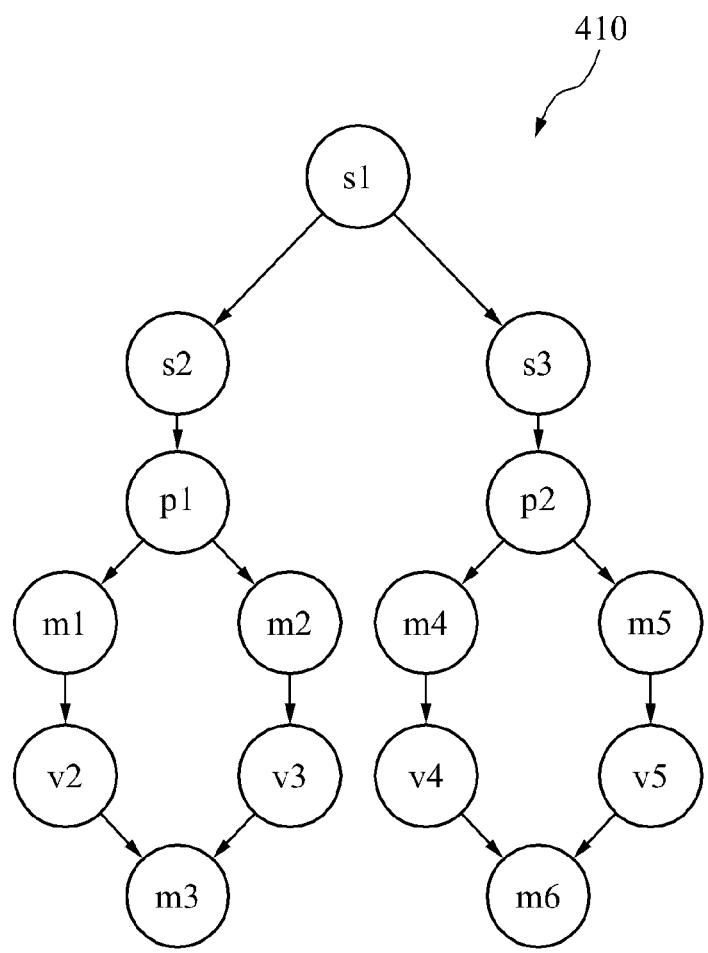

Referring to the example of FIG. 4A, a data dependency of the first loop is represented using a DFG 410. In the DFG 410, an instruction s1 precedes instructions s2 and s3. The instruction S2 precedes an instruction p1, and the instruction s3 precedes an instruction p2. The instruction p1 precedes instructions m1 and m2, and the instruction p2 precedes instructions m4 and m5. The instructions m1, m2, m4, and m5 precede instructions v2, v3, v4, and v5, respectively. The instructions v2 and v3 precede an instruction m3, and the instructions v4 and v5 precede an instruction m6.

Figure 4B:
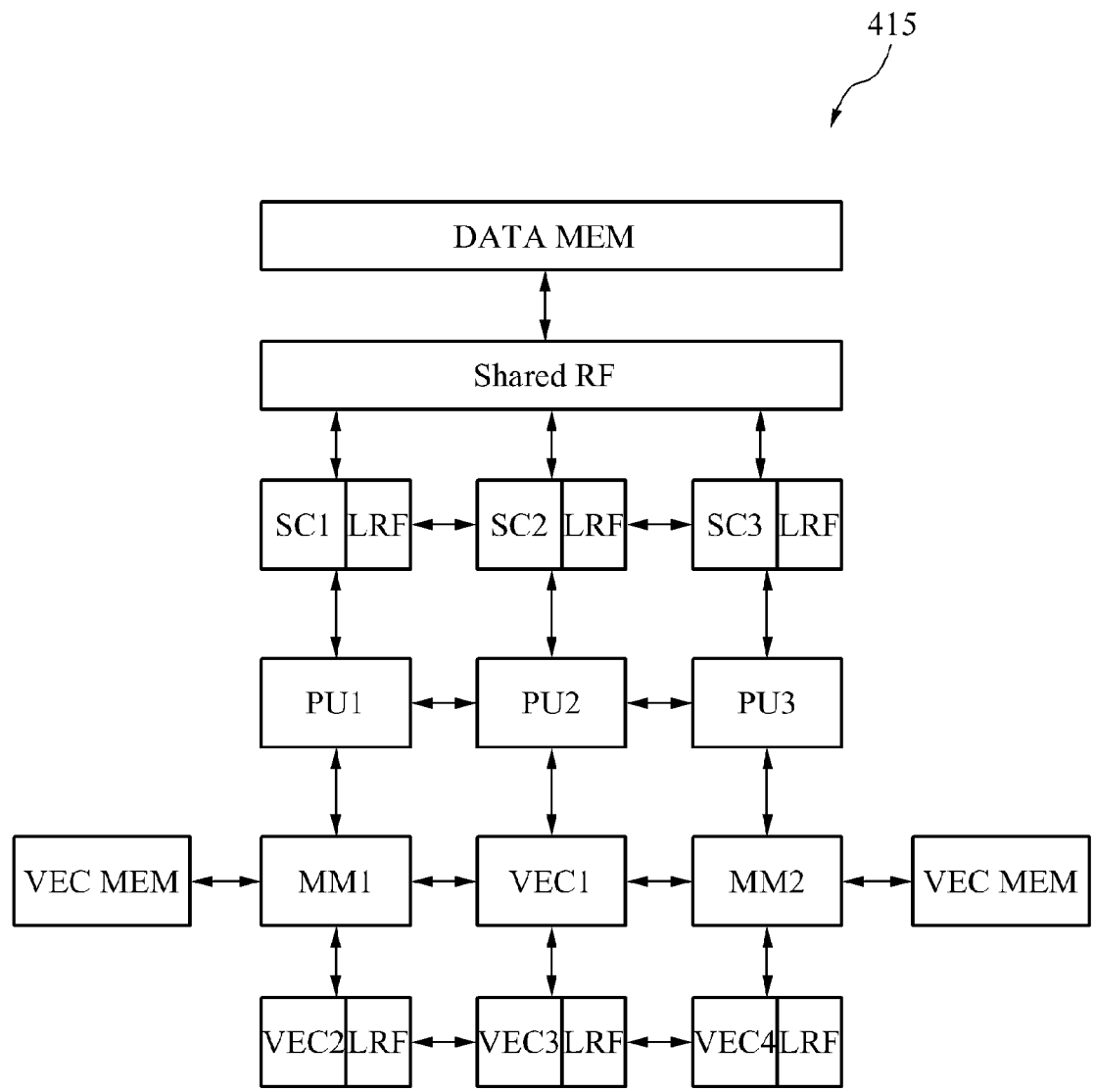

Referring to the example of FIG. 4B, a target architecture 415 includes a plurality of execution units SC1, SC2, SC3, PU1, PU2, PU3, MM1, MM2, VEC1, VEC2, VEC3, and VEC4. The plurality of execution units in the example of FIG. 4B exchange data with one another in a form of a mesh.

Referring to the example of FIG. 4C, the scheduler derives a result 420 of scheduling the first loop by mapping the DFG 410 of FIG. 4A to the target architecture 415 of FIG. 4B. In an example, the result 420 of scheduling the first loop includes only a kernel, but omits a prologue and an epilogue. The descriptions provided with reference to FIGS. 3A and 3B are potentially applicable to the operation in which the scheduler maps the DFG 410 of FIG. 4A to the target architecture 415 of FIG. 4B and thus, duplicated descriptions are omitted for brevity.

Figure 4D:
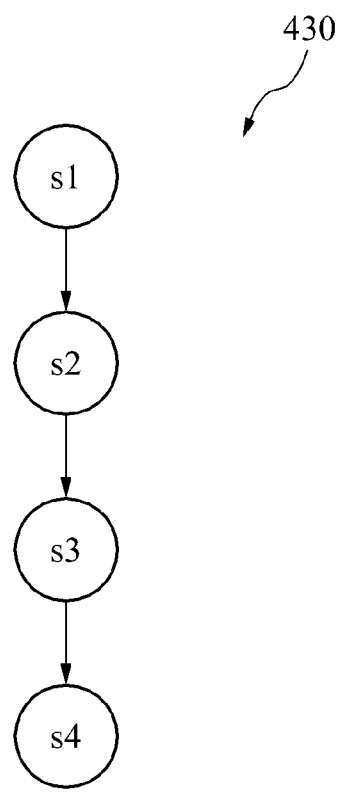

Referring to the example of FIG. 4D, a data dependency of the second loop is represented using a DFG 430. In the example of FIG. 4D, an instruction s1 precedes an instruction s2, the instruction s2 precedes an instruction s3, and the instruction s3 precedes an instruction s4.

Referring to the example of FIG. 4E, in a case in which a first loop and a second loop are scheduled separately, a result 440 of scheduling the second loop is derived. The result 440 shows a scheduling outcome. In the first cycle, s1 and s3 are scheduled, and in the second cycle, s2 and s4 are scheduled.

For example, a total number of cycles used to execute a loop is calculated using an equation II*(SC+(N−1)). In the equation, II denotes an initiation interval, SC denotes a stage count, and N denotes an iteration count. In this example, each iteration of the loop is partitioned into SC stages including IIs (cycles). Referring to FIG. 4C, an II of the first loop corresponds to 4 cycles, and a single iteration is performed by two stages. Thus, an SC of the first loop corresponds to "2". Referring to FIG. 4E, an II of the second loop corresponds to 2 cycles, and a single iteration is performed by 2 stages. Thus, in this example, an SC of the second loop corresponds to "2".

In this example, when an iteration count of the first loop corresponds to "100" and an iteration count of the second loop corresponds to "200", total numbers of cycles to be used to execute the first loop and the second loop are calculated as expressed by the following equations, respectively.

$$\text{loop1} = II^*(SC+(N-1)) = 4^*(2+(100-1)) = 404 \text{ cycles}$$

$$\text{loop2} = II^*(SC+(N-1)) = 2^*(2+(200-1)) = 402 \text{ cycles}$$

Thus, in this example, the total number of cycles to be used to execute both the first loop and the second loop is 806 cycles.

Referring to the example of FIG. 4F, the scheduler schedules the second loop using execution units available as a result of scheduling the first loop. The scheduler schedules the second loop using SC1 and SC3 of the second cycle and SC2 and SC3 of the fourth cycle in the result 420 of scheduling the first loop of FIG. 4C. In FIG. 4F, the scheduler schedules the second loop to be executed using execution units not in use in each cycle while the first loop is being executed. For example, the scheduler verifies whether an execution unit is available, based on a flag bit assigned to the execution unit. The scheduler verifies whether an execution unit is available by managing availabilities of HW resources in a table. To perform scheduling, the scheduler maps a DFG of the second loop to a target architecture. As a result of mapping, the scheduler determines an execution unit to be used to schedule the second loop. In various examples, the scheduler verifies whether the determined execution unit is available for scheduling the second loop, by confirming a flag bit of the determined execution unit or by verifying whether the determined execution unit is used for the first loop in the table. In a case in which the determined execution unit is available, the scheduler schedules the second loop using the determined execution unit. When the determined execution unit is already used to schedule the first loop, the scheduler detects another execution unit. In a case in which the second loop is successfully scheduled, the scheduler derives a scheduling result 450. In this example, the first loop and the second loop operate independently from each other. In other examples the first loop and the second loop have only a small amount of dependency on each other. In the scheduling result 450, numerals in parentheses indicate respective loops, (1) referring to the first loop and (2) referring to the second loop.

In a case in which an iteration count of the first loop corresponds to "100" and an iteration count of the second loop corresponds to "200", 100 iterations of the second loop are performed while the first loop is simultaneously iterated 100 times. Based on the scheduling result 400 of FIG. 4E, a remaining 100 iterations of the second loop are performed. Total numbers of cycles to be used to execute the first loop and the second loop are reduced using this scheduling approach as expressed by the following equations, respectively.

$$\text{loop1(100 iterations)} + \text{loop2(100 iterations)} = 404 \text{cycles} \quad (1)$$

$$\text{loop2(100 iterations)} = 2*(2+(100-1)) = 202 \text{ cycles} \quad (2)$$

In this example, the total number of cycles to be used to execute both the first loop and the second loop is reduced to 404+202=606 cycles by using this alternative scheduling approach.

For example, the scheduler selects two independent loops from among a plurality of loops included in source code, and determines priorities of the two selected loops. The scheduler potentially determines the priorities of the two loops based on various criteria. For example, the scheduler determines a loop including a greater number of available HW resources in a scheduling result to be a first loop, and a remaining loop to be a second loop. Hereinafter, the first loop is referred to as a loop having a higher priority, and the second loop is referred to as a loop having a lower priority. For example, to derive these priorities the scheduler determines a loop having a relatively greater iteration count to be the first loop, and determines a loop having a relatively smaller iteration count to be the second loop. The above examples of how the scheduler determines the first loop and the second loop based on criteria are shown in Table 4.

TABLE 4

| | Priority | | First loop | Second loop |
|---|---|---|---|---|
| (a) | Iteration(LoopA) > Iteration(LoopB) | II(LoopB) − II(LoopA) > M | LoopB | LoopA |
| (b) | | Otherwise | LoopA | LoopB |
| (c) | Otherwise | II(LoopA) − II(LoopB) > M | LoopA | LoopB |
| (d) | | Otherwise | LoopB | LoopA |

In Table 4, M denotes a user designated threshold value. Based on the criteria of Table 4, the scheduler determines a loop having a greater II to be the first loop in Case (a) and Case (c) in a case in which a difference in IIs is greater than M. The scheduler determines a loop having a greater iteration count to be the first loop Case (b) and Case (d) in a case in which the difference in IIs is less than or equal to M.

The scheduler schedules the second loop using HW resources mapped in each cycle as constraint conditions from the result of scheduling the first loop. In an example, the scheduler employs a modulo scheduling method for a target architecture of a CGRA structure. For example, the scheduler employ a Bing Mei's algorithm. The Bing Mei's algorithm operates by assigning instructions on a DFG to execution units at random, starting from a minimum II until scheduling is completed. Various randomization techniques are used to produce random or pseudorandom values that are used in the Bing Mei's algorithm to assign instructions.

In an example, in a case in which the second loop is not scheduled in the II in cycles of the first loop, the scheduler optionally unrolls the result of scheduling the first loop. In a case of unrolling the result of scheduling the first loop, a greater number of execution units potentially become available for scheduling the second loop. Thus, a possibility of success in scheduling the second loop potentially increases. For example, in a case of unrolling the scheduling result 420 of FIG. 4C, a scheduling result similar to a result obtained by copying the scheduling result 420 and pasting the copied scheduling result 420 below the scheduling result 420. In this example, since a doubled number of available HW resources are present in the unrolled scheduling result, when compared to the original scheduling result 420, the possibility of success in scheduling the second loop likely increases. Unrolling of the first loop is described further in detail with reference to FIGS. 5 and 6.

In Case (b) and Case (d), the iteration count of the first loop is greater than the iteration count of the second loop. In a case in which all iterations of the second loop are performed while the first loop is being executed, the scheduler prevents the second loop from being executed in a subsequent cycle. For example, the scheduler prevents, using predication guarding, the second loop from being executed in a subsequent cycle after the second loop is iterated. In such an example, the scheduler sets a predication bit to indicate whether a cycle of the second loop is completed in each cycle. Execution units for the second loop determine whether assigned instructions are to be executed based on a value of the predication bit.

In Case (a) and Case (c), the iteration count of the first loop is less than the iteration count of the second loop. In such an example, the scheduler schedules the second loop to execute a portion of iterations of the second loop in an execution period of the first loop and to newly execute remaining iterations of the second loop after an execution of the first loop is terminated. Then, the scheduler schedules the remaining iterations of the second loop in a manner similar to scheduling the first loop. In an example, the scheduler does not consider the first loop when scheduling the remaining iterations of the second loop. In this example, the remaining iterations of the second loop are executed based on schedule information including only the second loop after the execution of the first loop is terminated. In a case in which data used for a previous iteration is to be used for the remaining iterations of the second loop, the scheduler stores the corresponding data in a buffer. For example, the scheduler additionally schedules an instruction to store intermediate data of the second loop in the buffer when the execution of the second loop is terminated. The aforementioned instruction is possibly absent in the source code. However, the scheduler potentially automatically adds the aforementioned instruction.

Figure 5:
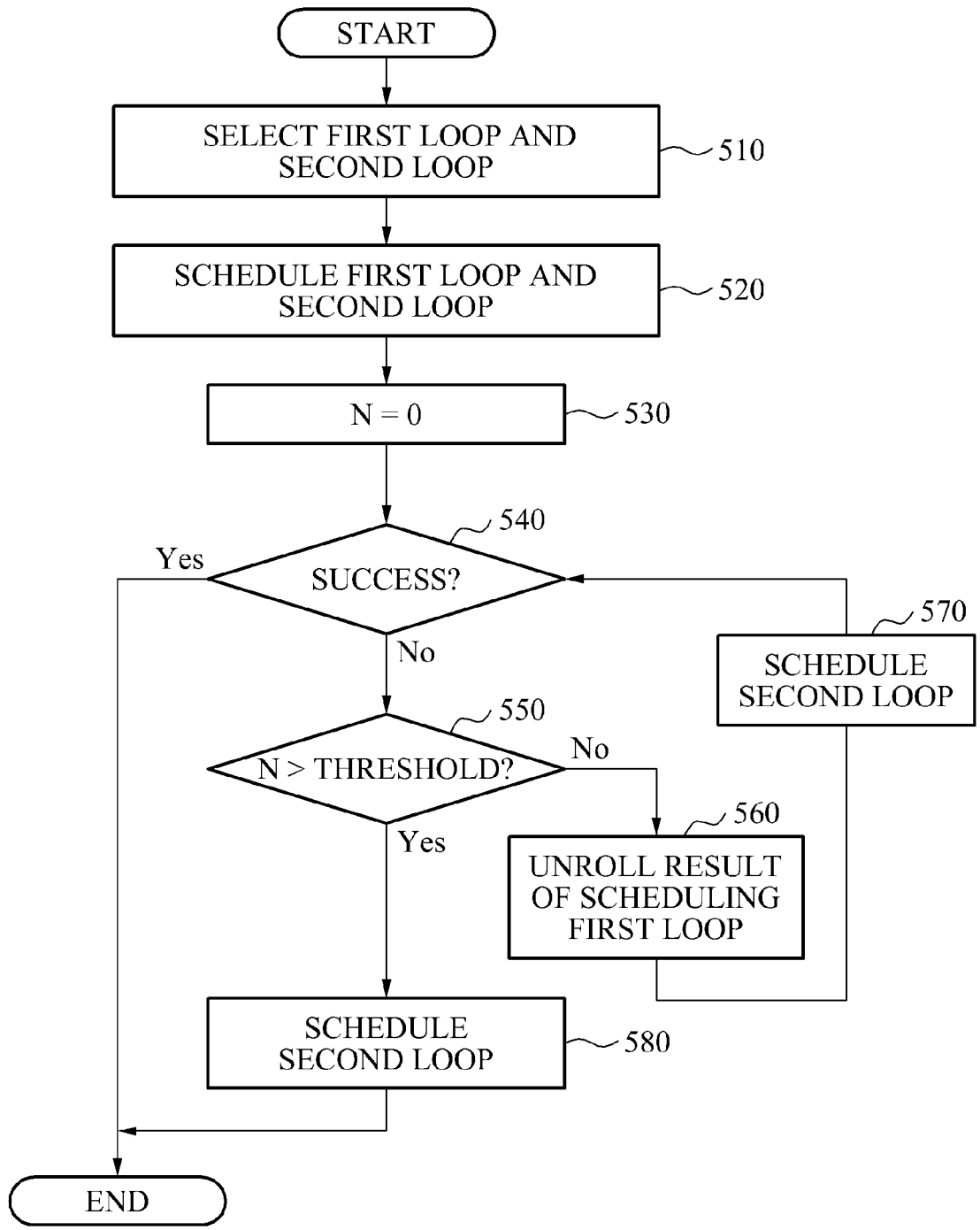
FIGS. 5 and 6 are flowcharts illustrating examples of scheduling a second loop by unrolling a result of scheduling a first loop.
Figure 6:
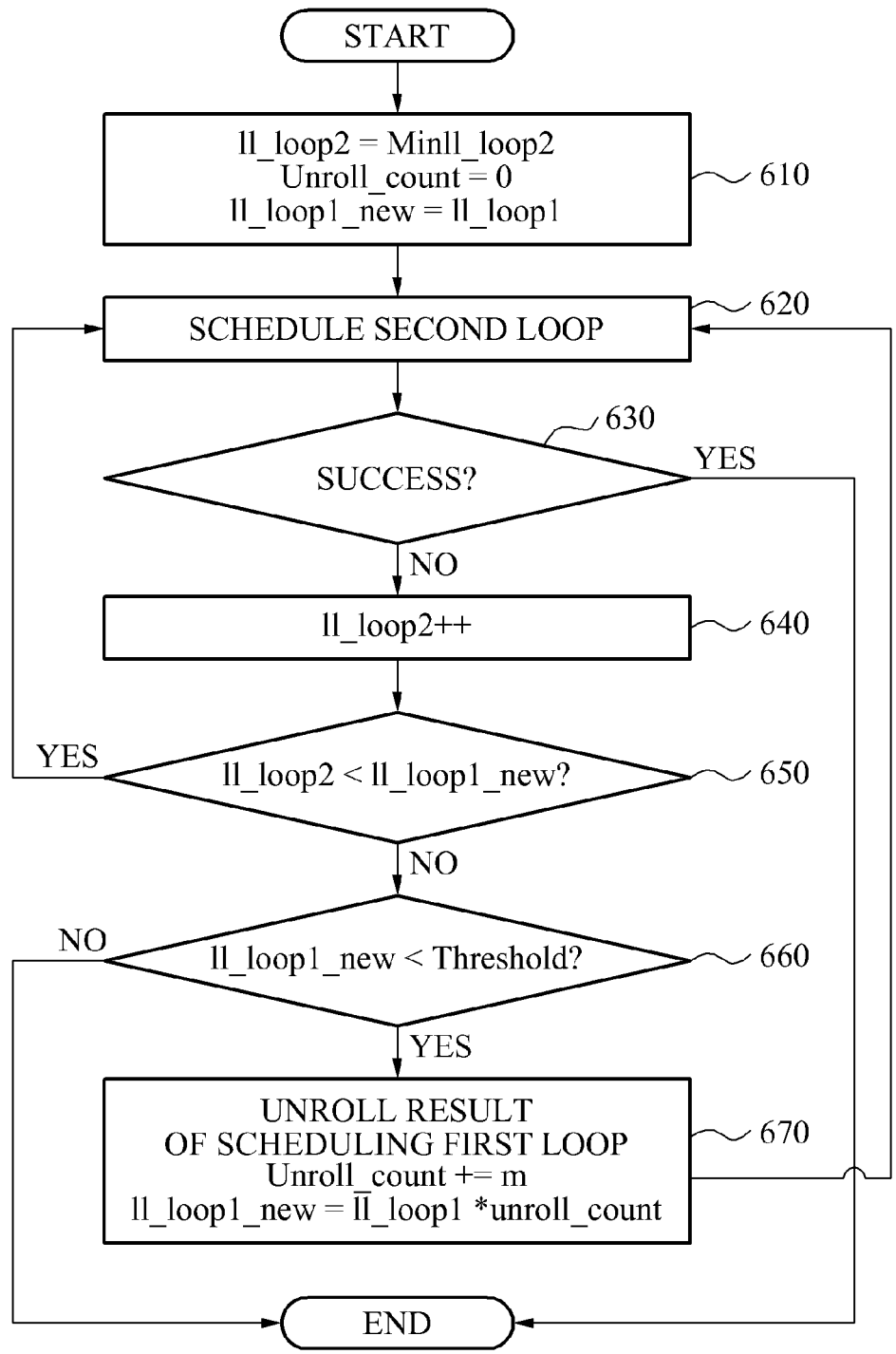
Figure 7:
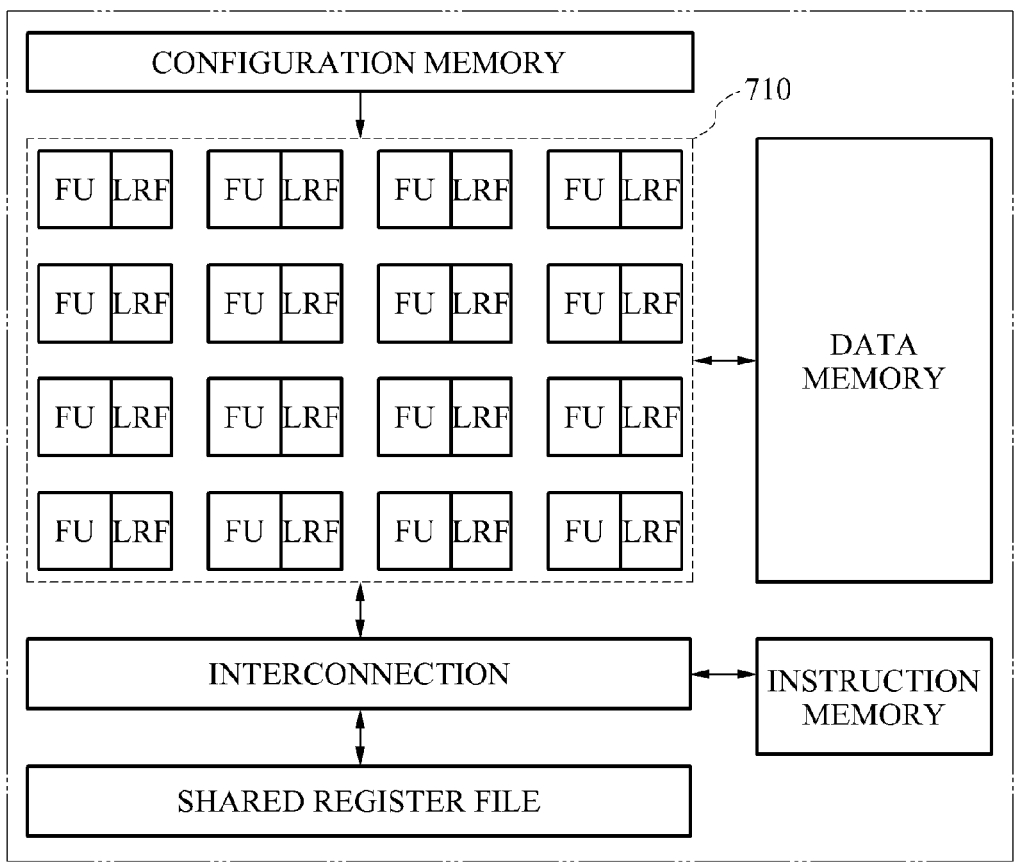

FIGS. 5 and 6 are flowcharts illustrating examples of scheduling a second loop by unrolling a result of scheduling a first loop.

Referring to FIG. 5, in operation 510, a method selects a first loop and a second loop. For example, a scheduler selects a first loop and a second loop. In operation 520, the method schedules the first loop and the second loop. For example, the scheduler schedules the first loop, and schedules the second loop using HW resources remaining after the first loop is scheduled. In operation 530, the method scheduler sets a variable N to count an unrolling count to "0". For example, the scheduler sets a variable N to count an unrolling count to "0". In operation 540, the method verifies whether the second loop is successfully scheduled. For example, the scheduler verifies whether the second loop is successfully scheduled. In a case in which the scheduling of the second loop fails, the method verifies whether a current unrolling count is greater than a predetermined threshold value in operation 550. For example, the scheduler verifies whether a current unrolling count is greater than a predetermined threshold value. In a case in which the current unrolling count is less than or equal to the threshold value, the method unrolls a result of scheduling the first loop in operation 560. For example, the scheduler unrolls a result of scheduling the first loop. In addition, in operation 560, the scheduler may increase the unrolling count. In operation 570, the method schedules the second loop using the unrolled result of scheduling the first loop. For example, the scheduler schedules the second loop using the unrolled result of scheduling the first loop. To perform the method, the scheduler thus iteratively performs operations 540, 550, 560, and 570. In a case in which it is verified in operation 550 that the unrolling count is greater than the predetermined threshold value, the method typically schedules the second loop in operation 580. In operation 580, the method schedules the second loop. For example, the scheduler schedules the second loop, separately from the first loop. Accordingly, the scheduler prevents an amount of time used to schedule a loop from increasing to be greater than or equal to a predetermined value. The scheduler thus prevents a deterioration of an ILP performance of a scheduling result, when compared to before the aforementioned example loop scheduling method is applied.

Referring to FIG. 6, in operation 610, the method sets an II of the second loop (II_loop2) to be a predetermined minimum II (MinII_loop2). For example, the scheduler sets an II of the second loop (II_loop2) to be a predetermined minimum II (MinII_loop2). The scheduler sets an unrolling count (Unroll_count) to "0", and sets an II of the first loop (II_loop1_new) to be an II of the first loop (II_loop1) in a non-unrolled state. In operation 620, the method schedules the second loop based on the II of the second loop. For example, the scheduler schedules the second loop based on the II of the second loop. In such an example, when the predetermined minimum II corresponds to "2", the scheduler schedules the second loop within 2 cycles. In operation 630, the method verifies whether the second loop is successfully scheduled. For example, the scheduler verifies whether the second loop is successfully scheduled. When the second loop is not scheduled, the method increases the II of the second loop in operation 640. For example, the scheduler increases the II of the second loop. In operation 650, the method verifies whether the II of the second loop is within the II of the first loop. For example, the scheduler verifies whether the II of the second loop is within the II of the first loop. To perform the method, the scheduler thus iteratively performs operations 620, 630, 640, and 650. In a case in which it is verified in operation 650 that the increased II of the second loop is greater than the II of the first loop, the method verifies whether the II of the first loop is less than or equal to a predetermined threshold value in operation 660. For example, the scheduler verifies whether the II of the first loop is less than or equal to a predetermined threshold value. In a case in which the II of the first loop is less than or equal to the predetermined threshold value, the method unrolls a result of scheduling the first loop in operation 670. For example, the scheduler unrolls a result of scheduling the first loop. In such an example, the scheduler selects a value m that satisfies the relation iteration count of the first loop % m=0 where % is the modulo operator, and unrolls the result of scheduling the first loop by a factor of m. For example, when the iteration count of the first loop corresponds to "300", and the selected m corresponds to "3", the scheduler may unroll the result of scheduling the first loop to increase three times. In this example, the iteration count of the unrolled first loop is updated to be "100", which corresponds to 1/m of the existing iteration count of the first loop. Thus, the scheduler updates the unrolling count by adding m to the existing unrolling count, and updates the II of the first loop with II_loop1*unroll_count. The scheduler returns to operation 620 to schedule the second loop using the unrolled result of scheduling the first loop. To perform the method, the scheduler thus iteratively performs operations 620, 630, 640, 650, 660, and 670.

FIGS. 7, 8A and 8B, and 9 through 12 illustrate examples of an optimized target architecture. Example loop scheduling methods are applicable to various target architectures. In an example, the loop scheduling method is applicable to a processor 700 including a CGRA configuration 710 of FIG. 7. Using the loop scheduling method, an object code that optimizes an ILP performance of the processor 700 is generated. The CGRA configuration 710 is provided as an example only, and is optionally modified to include one or more of a random number of FU arrays, a random interconnection, a shared register file, a local register file (LRF), a configuration memory, an instruction memory, and a data memory. Each FU potentially performs an arbitrary number of operations, or is used for data routing. An FU receives input data from a register file or an output port of another FU, and transmits output data to a register file or an input port of another FU. In addition, in an example a predicate operation is supported to control an epilogue or a prologue or to execute a conditional branch. For example, the configuration memory stores CGRA configuration information. In such an example, the CGRA configuration information stored in the configuration memory is decoded by a configuration fetch/decode unit to generate a signal to control a register file, an FU, multiplexers (MUXs), and an interconnection.

Figure 8A:
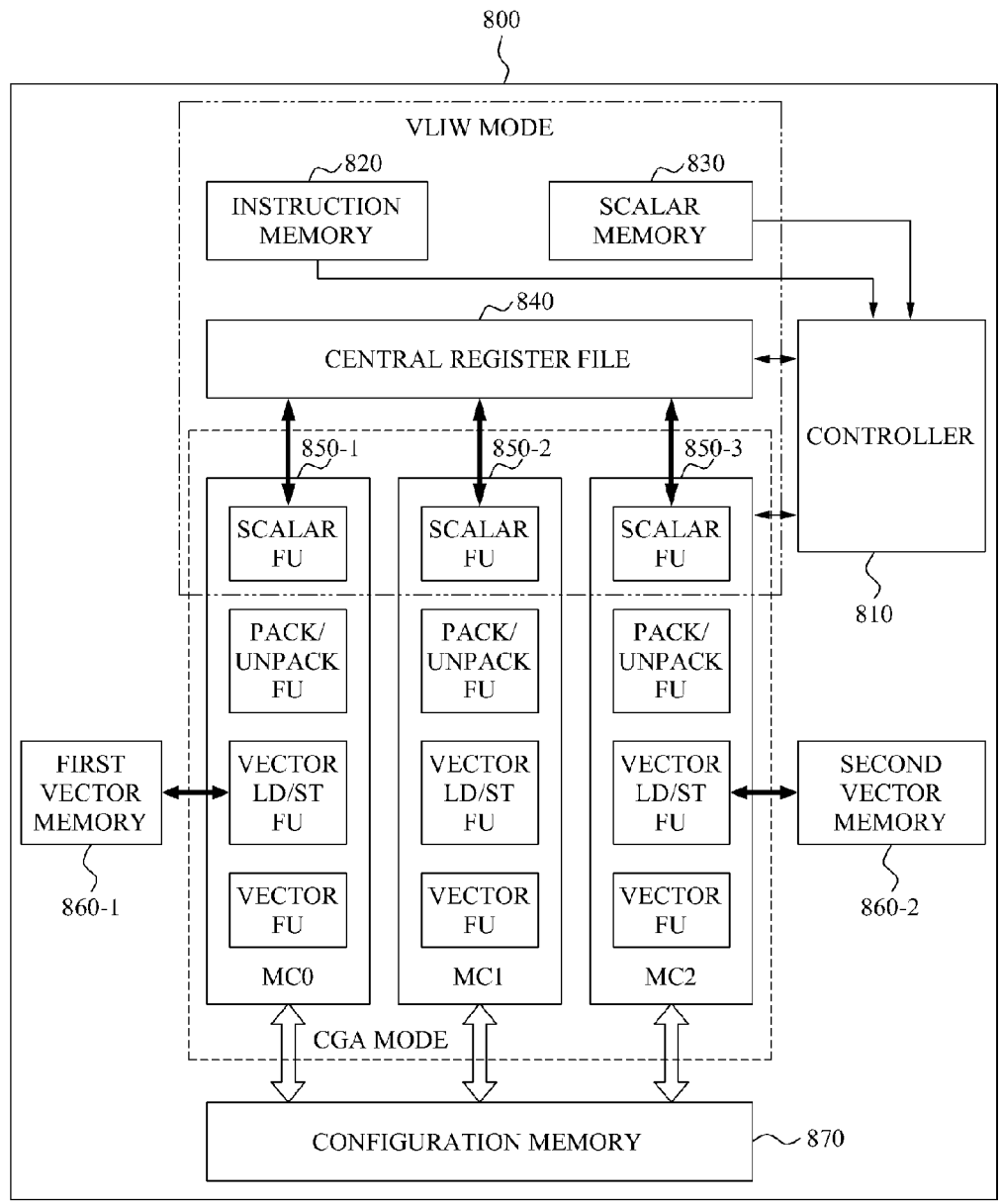

The example loop scheduling methods are also applicable to a processor 800 of FIG. 8A. In the example of FIG. 8A, the loop scheduling method maps a DFG of a first loop or a DFG of a second loop to a target architecture of the processor 800. A scheduling result generated using the loop scheduling method is stored in a configuration memory 870. The processor 800 processes the first loop and the second loop in parallel using the result stored in the configuration memory 870 in a CGA (Coarse-Grained Array) mode. The CGA mode is discussed above as CGRA mode. The target architecture of the processor 800 is now described further.

Referring to FIG. 8A, the processor 800 includes a controller 810, an instruction memory 820, a scalar memory 830, a central register file 840, mini-cores, vector memories, and a configuration memory 870. In FIG. 8A, the mini-cores include MC0 850-1, MC1 850-2, and MC2 850-3. Each of MC0 850-1, MC1 850-2, and MC2 850-3 corresponds to an individual mini-core 900. The vector memories include a first vector memory 860-1, and a second vector memory 860-2. The controller 810 also optionally controls other constituent elements of the processor 800. In an example, the controller 810 controls the mini-cores. As part of controlling the mini-cores, the controller 810 suspends operations of a portion or all of the mini-cores. The controller 810 thus performs the function of the processor 800 described in relation to operations of the mini-cores, a thread execution, and a connection of vector FUs. The instruction memory 820 and the configuration memory 870 store instructions to be executed by the processor 800 or the mini-cores. The scalar memory 830 stores scalar data. The central register file 840 stores registers.

FIG. 8B illustrates an example architecture of the controller 810. The controller 810 includes a selector 811 that selects independent loops from among loops included in source code, a determiner 812 that determines, among the selected loops, a first loop having a higher priority and a second loop having a lower priority, a scheduler 813 configured to schedule the first loop using execution units and to schedule the second loop using the execution units available as a result of the scheduling of the first loop, and a generator 814 configured to generate an object code comprising the result of the scheduling of the first loop and a result of the scheduling of the second loop. For example, the selector 811, the determiner 812, the scheduler 813, and the generator 814 are implemented as hardware devices that are components of the controller 810 and have a structure corresponding to the operations they perform. In an example, the controller 810 receives as inputs to the selector 811 data from the instruction memory 820 and/or the scalar memory 830. Also in an example, the controller outputs data as outputs from the generator data to the central register file 840 and to the mini-cores 850.

In examples, the processor 800 operates in a VLIW mode and a CGRA mode. In the VLIW mode, the processor 800 processes the scalar data or perform a control operation. In the CGRA mode, the processor 800 processes an operation of a loop included in a code for which accelerated and/or parallel processing is required. In this example, the loop corresponds to a recursive loop. The operation within the loop may require heavy vector processing. However, in an example, control-associated instructions are available only in the VLIW mode, and vector instructions are available only in the CGRA mode. A strict separation of instructions between the two modes simplifies a design of the processor 800, and increases the power efficiency of the processor 800.

In the example of FIG. 8A, in the VLIW mode, instructions are fetched from the instruction memory 820. The fetched instructions are executed by scalar FUs of the plurality of mini-cores. In the CGRA mode, instructions are fetched from the configuration memory 870. The fetched instructions may be executed by all FUs of the plurality of mini-cores. Among the FUs of the plurality of mini-cores, the scalar FUs are used in both the VLIW mode and the CGRA mode. Thus, the scalar FUs are shared in the VLIW mode and the CGRA mode. For example, in FIG. 8A the processor 800 simultaneously operate the three scalar FUs 850-1, 850-2 and 850-3 among the FUs of the mini-cores, when operating in the VLIW mode. In such an example, when an operation mode of the processor 800 is switched from the VLIW mode to the CGRA mode, the processor operates all of the FUs of the plurality of mini-cores. When the processor 800 operates in the CGRA mode, the processor 800 operate all of the FUs of the plurality of mini-cores to support accelerated processing. Thus, when the processor 800 operates in the VLIW mode, the processor 800 suspends operations of unnecessary remaining FUs, except the scalar FUs among the FUs of the plurality of mini-cores, thereby operating in a power saving mode. The other remaining FUs are designed to be used for purposes that are more relevant to accelerated or parallel processing. The remaining FUs, examples of which are presented in FIG. 8A, include pack/unpack FUs, vector load/store (LD/ST) FUs, and vector FUs. However, other types of FUs are used in other examples. By transmitting parameters to be used in both modes through common FUs, the processor 800 switches the operation mode quickly, and data copying between the VLIW mode and the CGRA mode is prevented.

Among the FUs of the plurality of mini-cores, only the scalar FUs are able to access the central register file 840. By restricting access to the central register file 840 to the scalar FUs, a wide register file is excluded. For example, each of the mini-cores has a read access permission with respect to the central register file 840, and only each of the scalar FUs of mini-cores has a write access permission with respect to the central register file 840. Each of the mini-cores uses one of the plurality of vector memories. For example, each of the mini-cores includes one of the vector memories. In FIG. 8A, MC0 850-1 uses the first vector memory 860-1, and MC2 850-3 uses the second vector memory 860-2. By providing a separate vector memory to each of the mini-cores, a complex structure to share a vector memory, similar to a queue, is not required. A memory provided separately to each mini-core also simplifies a memory access logic. The exclusion of the complex structure, as discussed potentially simplify the design of the processor 800, and provides benefits to the processor in terms of a power and an area.

FIGS. 9 through 12 illustrate examples of a mini-core included in the processor 800 of FIGS. 8A and 8B.

Figure 9:
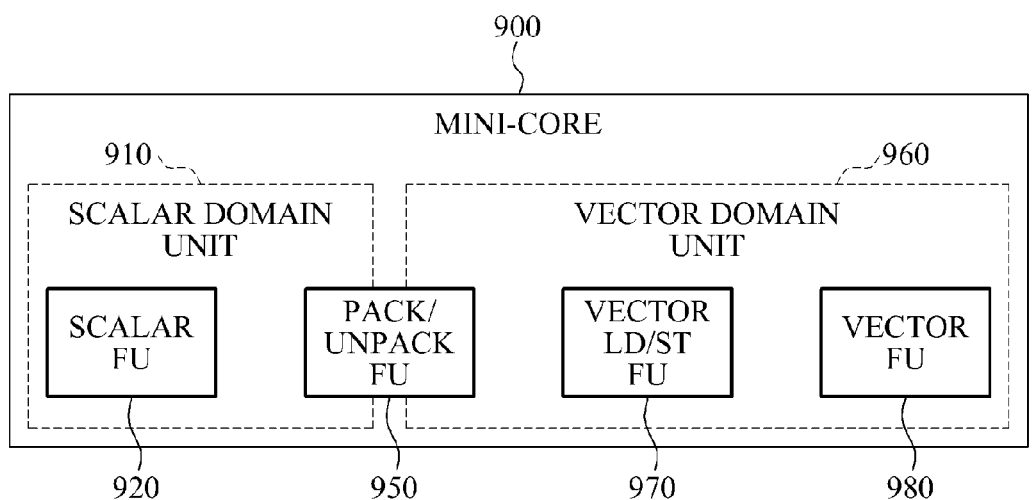

Referring to FIG. 9, a loop scheduling method schedules a first loop and a second loop using a plurality of FUs included in a mini-core 900. When a structure of the mini-core 900, for example, a configuration of the FUs, and a connection among the FUs in the mini-core 900, changes, a target architecture of the loop scheduling method also change. Hereinafter, the target architecture of the mini-core 900 is described further.

The mini-core 900 refers to a unit core configured to combine a plurality of FUs. The mini-core 900 includes a scalar domain unit 910, and a vector domain unit 960. In the example of FIG. 9, the scalar domain unit 910 performs an operation on scalar data. The vector domain unit 960 performs an operation on vector data. For example, the scalar domain unit 910 includes FUs for the operation on the scalar data. In the example of FIG. 9, the scalar domain unit 910 includes a scalar FU 920, and a pack/unpack FU 950. The vector domain unit 960 includes FUs for the operation on the vector data. The vector domain unit 960 includes the pack/unpack FU 950, a vector LD/ST FU 970, and a vector FU 980. Thus, the mini-core 900 includes the scalar FU 910, the pack/unpack FU 950, the vector LD/ST FU 970, and the vector FU 980. Types and a number of the aforementioned FUs are examples only, and other types and numbers of FUs are used in other examples. Scalar FUs 920, pack/unpack FUs 950, vector LD/ST FUs 970, and vector FUs 980 are provided in various examples. The scalar FU 920 processes an operation on scalar data, and a control-associated code or instruction. In this example, the control-associated code or instruction refers to a code or instruction associated with a comparison operation or a branch operation. The scalar FU 920 processes loading and storing of the scalar data. In an example, the scalar FU 920 also processes single-cycle instructions that are commonly used. The scalar data corresponds to data of a minimum operation unit, rather than a combination of items of data. In general, the following basic primitive data types are regarded as types of scalar data. First, a Boolean data type. Second, a Numeric type, for example, "int", "short int", "float", and "double". Third, a Character type (for example, "char", and "string").

The scalar FU 920 is used for a single data type and thus, in general, the scalar FU 920 uses a data path of a relatively low bit-width. The vector LD/ST FU 970 processes loading and storing of the vector data. The vector LD/ST FU 970 loads data from a vector memory, and stores data in the vector memory. The loading and storing of the vector data is performed by only the vector LD/ST FU 970. The vector FU 980 may process an operation on the vector data. In an example, the vector FU 980 processes the operation on the vector data using single instruction multiple data (SIMD) techniques. The operation on the vector data may include a vector arithmetic operation, a shift operation, a multiplication operation, a comparison operation, and a data shuffling operation, as examples. Also, several special instructions for soft-demapping are potentially supported in a VFU (Vector FU) mode which is described further, later.

The SIMD approach refers to a parallel method of simultaneously processing a plurality of items of data using a single instruction. In the SIMD approach, a plurality of operation devices simultaneously processes a plurality of items of data by simultaneously applying the same operation to the plurality of items of data. The SIMD approach is used, for example, for a vector processor. In this example, the vector data refers to data including multiple items of scalar data of the same type. In one example, the vector data is data of an operation unit into which the plurality of items of scalar data is merged. For example, in Open Computing Language (OpenCL), types of vector data, for example, "charn", "ucharn", "shortn", "ushortn", "intn", "longn", "ulongn", and "floatn" are defined. For these types, n denotes a number of items of scalar data. For example, a value of n is greater than or equal to "2". In general, 2, 4, 8, or 16 is used as the value of n. Since the vector data corresponds to items of data being merged, the vector FU 980 requires a data-path of a relatively high bit-width. The vector FU 980 is a unit configured to process a plurality of items of data in parallel. Thus, in this example, a dimension of the vector FU 980 is greater than dimensions of other FUs, and occupies a largest portion of an area within the mini-core 900.

The pack/unpack FU 950 processes data conversion for data transmission between the scalar domain unit 910 and the vector domain unit 960. In the example of FIG. 9, the pack/unpack FU 950 is a common FU of the scalar domain unit 910 and the vector domain unit 960. For example, the pack/unpack FU 950 is shared between the scalar domain unit 910 and the vector domain unit 960. In this example, the pack/unpack FU 950 converts a plurality of items of scalar data to vector data. The pack/unpack FU 950 generates vector data by merging a plurality of items of scalar data. Also, in another example, the pack/unpack FU 950 generates or updates vector data by inserting scalar data into a predetermined location of the vector data. The pack/unpack FU 950 converts vector data to a single item of scalar data or a plurality of items of scalar data. The pack/unpack FU 950 also potentially generates a plurality of items of scalar data by partitioning vector data. The pack/unpack FU 950 also potentially generates scalar data by extracting elements from a slot or a predetermined location of vector data. The elements of the vector data potentially correspond to scalar data. The pack/unpack FU 950 is potentially disposed in the middle between a scalar domain and a vector domain, and acts as a bridge between the scalar domain and the vector domain. Data exchange between the scalar domain and the vector domain is potentially performed after data type conversion is performed by the pack/unpack FU 950 acting as the bridge between the scalar domain and the vector domain.

Through combinations of the FUs as described above, the mini-core 900 processes all instructions to be processed by a processor. Thus, although only a single mini-core 900 is independently present or operates in the processor, the processor is operable to perform its operations. As described above, FUs are classified into types of core FUs, for example, the scalar FU 920, the pack/unpack FU 950, the vector LD/ST FU 970, and the vector FU 980, and the core FUs may constitute the mini-core 900. Through an extension of the mini-core 900, in lieu of an arbitrary combination of various FUs, a logic in the processor is simplified. In addition, through the extension of the mini-core 900, a number of cases designed in a design space exploration (DSE) potentially significantly decreases.

Figure 10:
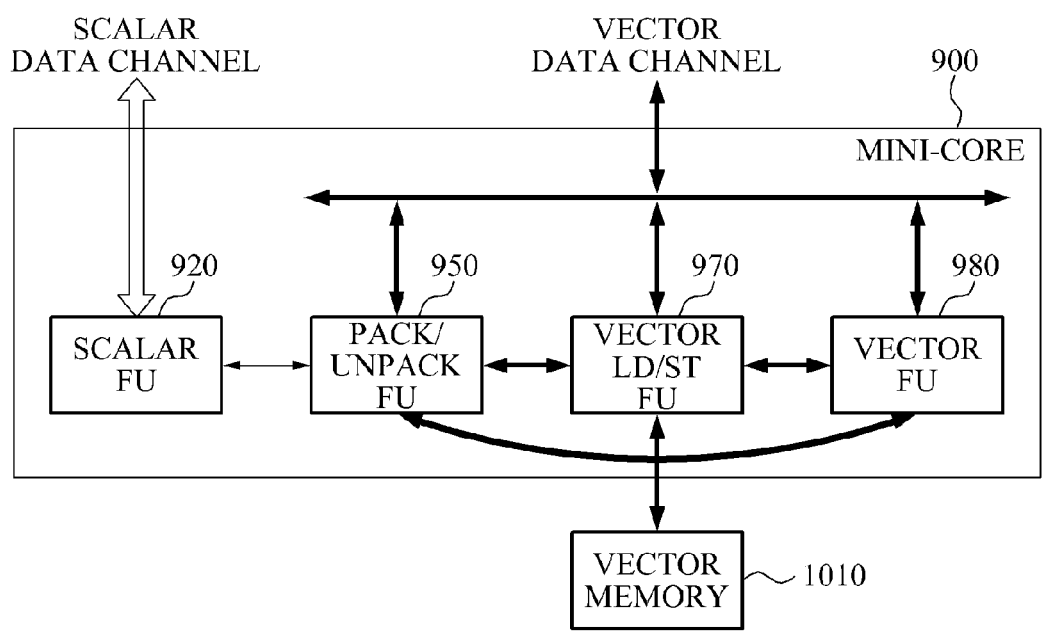

FIG. 10 illustrates an example of data paths in the mini-core 900 of FIG. 9.

Referring to FIG. 10, data-paths are present between FUs of the scalar domain unit 910. For example, the mini-core 900 includes a data path between the scalar FU 920 and the pack/unpack FU 950. Data paths are present between FUs of the vector domain unit 960. For example, the mini-core 900 includes a data path between each pair of the FUs, among the pack/unpack FU 950, the vector LD/ST FU 970, and the vector FU 980.

As illustrated in FIG. 10, there is potentially no data-path directly connecting an FU of the scalar domain unit 910 and an FU of the vector domain unit 960 to each other, except the pack/unpack FU 950. Hence, interaction between the scalar domain unit 910 and the vector domain unit 960 passes through the pack/unpack FU 950. Data transfer between the scalar domain unit 910 and the vector domain unit 960 is performed after the type conversion is performed by the pack/unpack FU 950. In examples, the type conversion includes a conversion from scalar data to vector data, and a conversion from vector data to scalar data. However, FUs in the same domain have a full data connection. Additionally, it is possible that a width of a data-path differs for each domain.

As an exception to the structure just discussed, a value of a message address for loading or storing, which is calculated by the scalar FU 920, is transferred, in an example, to the vector LD/ST FU 970. Thus, the mini-core 900 includes, in this example, a data path used to transfer the memory address for loading or storing from the scalar FU 920 to the vector LD/ST FU 970. In this example, the data path used to transfer the memory address is a relatively narrow data path. Similarly, in this example, a data path to be used to transfer data is a relatively broad data path.

In an example, there are two types of channels to be used for data transfer between mini-cores. The two types of channels include a scalar data channel, and a vector data channel. The mini-core 900 transmits and receives scalar data to and from another mini-core through the scalar data channel. For example, the scalar data channel is connected to an FU of the scalar domain unit 910. The mini-core 900 transmits and receives vector data to and from another mini-core through the vector data channel. The vector data channel is connected to an FU of the vector domain unit 960. The mini-core 900 potentially has scalar data channels corresponding to a number of other mini-cores to transmit scalar data to the other mini-cores, respectively. In such a case, the scalar data channels are potentially connected to the other mini-cores, respectively. For multi-path operation, the mini-core 900 has scalar data channels greater than the number of the other mini-cores. The mini-core 900 thus exchanges scalar data with another mini-core through scalar data channels.

In another example, the mini-core 900 also has vector data channels corresponding to a number of other mini-cores to transmit vector data to the other mini-cores, respectively. In this example, the vector data channels are connected to the other mini-cores, respectively. For multi-path operation, the mini-core 900 has vector data channels greater than the number of the other mini-cores. The mini-core 900 thus exchanges vector data with another mini-core through a plurality of vector data channels. Through a configuration of the data channels as described above, a data path between FUs where a connection is not required for successful operation s excluded from the mini-core and the processor. By eliminating such an unnecessary data path from the data paths among the FUs, connections within the mini-core 900 or the processor are minimized. For example, such an unnecessary data path may be a data path between the scalar FU 920 and the vector FU 980. By providing the scalar data channel and the vector data channel to the mini-core 900, data transmission between mini-cores is simplified and performance is improved.

The mini-core 900 also includes a vector memory 1010. In this example, the vector memory 1010 is memory dedicated to the vector LD/ST FU 970. The mini-core 900 of FIG. 10 also further includes an access port to be used for an access of the vector LD/ST FU 970 to the vector memory 1010. Through the access to the vector memory 1010 through the access port, the vector memory 1010 is not shared with FUs other than the vector LD/ST FU 970. Since the vector memory 1010 is not shared, a number of ports is reduced because additional ports would be required if the vector memory were shared. Also, an access logic associated with an access to the vector memory 1010 may be simplified. The reduction in the number of ports and the simplification of the access logic may be advantageous in terms of a power consumption of the processor and an area of the mini-core 900.

Figure 11:
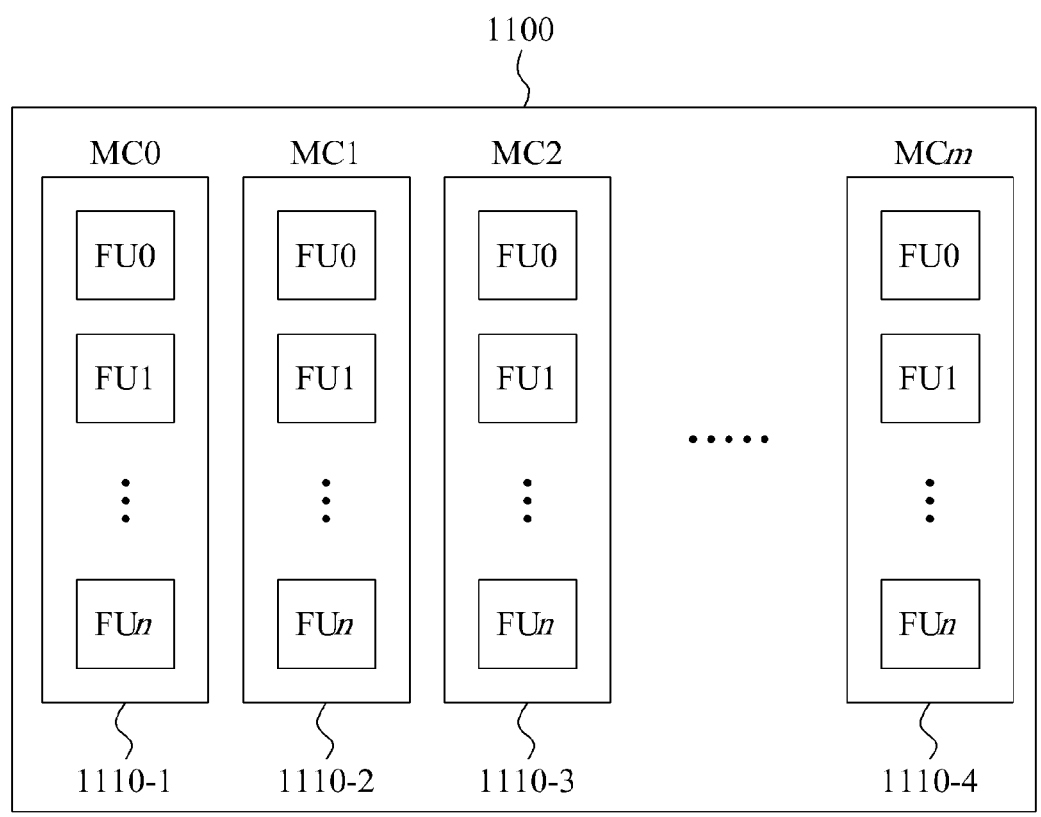

FIG. 11 illustrates an example of an easy extendibility of a mini-core.

Referring to the example of FIG. 11, a processor 1100 includes one or more mini-cores. Each of the one or more mini-cores is similar to the mini-core 900 described with reference to FIG. 9. In FIG. 11, the one or more mini-cores includes MC0 1110-1, MC1 1110-2, MC2 1110-3, . . . , and MCm 1110-4. Each of MC0 1110-1, MC1 1110-2, MC2 1110-3, . . . , and MCm 1110-4 are similar to the mini-core 900. The processor 1100 includes m+1 mini-cores. FUs included in each mini-core are illustrated. In FIG. 11, the FUs of each mini-core are represented as FU0, FU1, and FUn. Each mini-core includes n+1 FUs. In examples, each FU corresponds to one of the scalar FU 920, the pack/unpack FU 950, the vector LD/ST FU 970, and the vector FU 980. Among the one or more mini-cores, the first mini-core MC0 1110-1 corresponds, in an example to the mini-core 900 of FIG. 9. As described with reference to FIG. 9, the single mini-core 900 potentially processes all instructions to be processed by the processor. When an application is executed by the processor 1100, a number of operations required by the application potentially differs for each application. The processor 1100 thus handles a number of operations required by an application using a single mini-core 900 with respect to a simple application. The processor 1100 adjusts a number of mini-cores 900 to be used to handle a number of operations required by an application that requires a greater number of operations. By extending efficiently configured mini-cores, the processor 1110 is easily designed and simplified.

Figure 12:
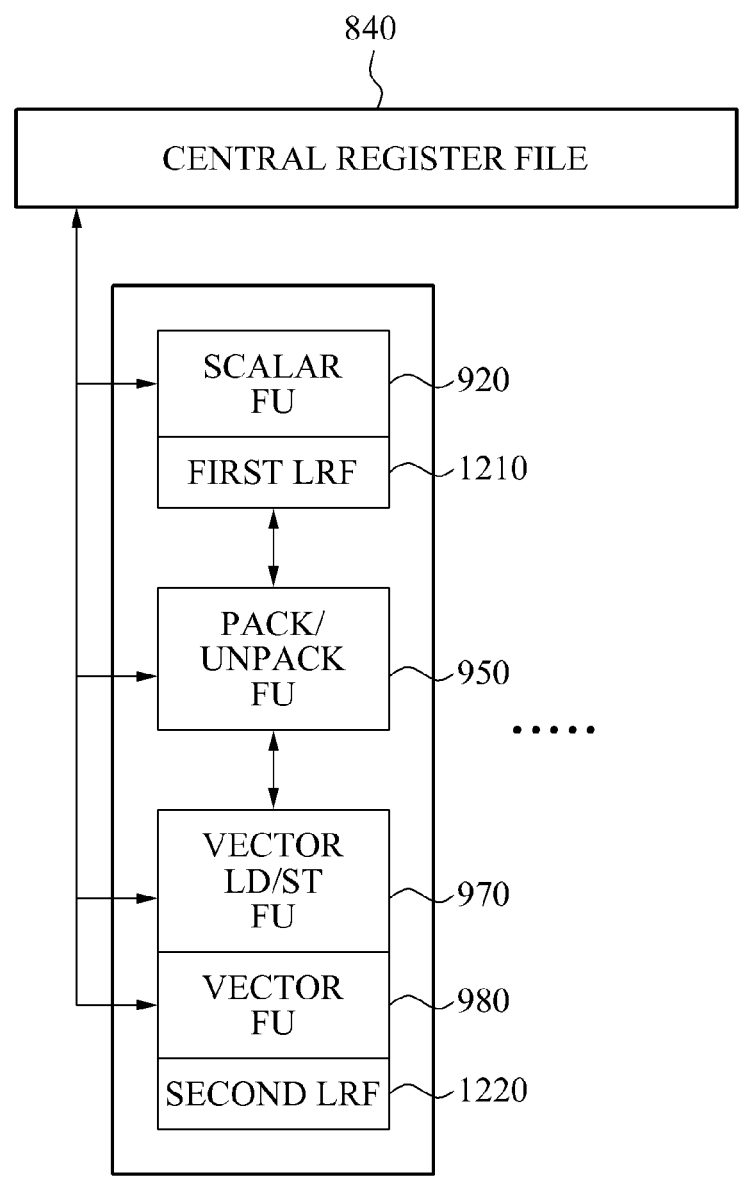

Referring to the example of FIG. 12, the processor 800 of FIGS. 8A and 8B potentially provides two types of register files. In general, the central register file 840 of FIGS. 8A and 8B is used for data transmission between the VLIW mode and CGRA mode. Live-in variables and live-out variables of the CGRA mode remain in the central register file 840. The mini-core 900 of FIG. 9 further includes a first LRF 1210 for the scalar FU 920, and a second LRF 1220 for the vector FU 980. When the scalar FU 920 requests scalar data after several cycles are completed, the first LRF 1210 temporarily stores the scalar data. When the vector FU 980 requests vector data after several cycles are completed, the second LRF 1220 temporarily stores the vector data. Based on the examples described above, the mini-core 900 corresponding to a combination of a plurality of FUs is configured to process data. A structure of data paths, for example, the FUs and the connections among the FUs, is simplified by the mini-core 900 according to an example. By adjusting a number of mini-cores, the processor has an extendibility to readily handle a number of required operations. The mini-core 900 and the processor, according to examples have features that cause them to be appropriate for wide used in multimedia fields and communications field using a DLP (Data Level Parallelism).

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A loop scheduling method comprising:
scheduling, using a processor, a higher priority loop using execution units;
scheduling, using the processor, a lower priority loop using execution units available as a result of the scheduling of the higher priority loop;
unrolling, using the processor, a result of the scheduling of the higher priority loop in response to the lower priority loop not being scheduled using the available execution units as a result of the scheduling of the higher priority loop; and
scheduling, using the processor, the lower priority loop using execution units available as the unrolled result of the scheduling of the higher priority loop.

2. The loop scheduling method of claim 1, wherein the scheduling of the higher priority loop comprises scheduling a highest priority loop using the execution units.

3. The loop scheduling method of claim 1, wherein the scheduling of the lower priority loop comprises scheduling at least a portion of the lower priority loop using execution units yet to be assigned to the higher priority loop, in cycles for which the higher priority loop is scheduled.

4. The loop scheduling method of claim 1, wherein the scheduling of the higher priority loop comprises:
selecting independent loops from among loops included in source code; and
determining priorities of the selected independent loops.

5. The loop scheduling method of claim 1, wherein a priority of the higher priority loop is higher than a priority of the lower priority loop, and a priority of a loop is calculated based on at least one of an iteration count of the loop and a number of cycles for a single iteration of the loop.

6. The loop scheduling method of claim 1, wherein the scheduling of the lower priority loop comprises assigning instructions to the available execution units in cycles for which the higher priority loop is scheduled, based on a data dependency among the instructions included in the lower priority loop.

7. The loop scheduling method of claim 1, wherein the scheduling of the lower priority loop comprises:
determining an execution unit to be used to schedule the lower priority loop; and
verifying whether the determined execution unit is available in a cycle for which the higher priority loop is scheduled.

8. The loop scheduling method of claim 1, wherein the scheduling of the higher priority loop comprises assigning instructions to the execution units in cycles, based on a data dependency among the instructions included in a highest priority loop.

9. The loop scheduling method of claim 1, wherein the unrolling comprises determining whether the result of the scheduling of the higher priority loop is to be unrolled, based on at least one of a threshold value for an unrolling count and a threshold value for a number of cycles of the unrolled result of the scheduling of the higher priority loop.

10. The loop scheduling method of claim 1, wherein the scheduling of the lower priority loop comprises restricting, using predication guarding, an execution of the lower priority loop after the lower priority loop is iterated in response to an iteration count of the higher priority loop being greater than an iteration count of the lower priority loop.

11. The loop scheduling method of claim 1, further comprising:
scheduling, using the processor, the lower priority loop to iterate a remaining portion of the lower priority loop after the higher priority loop is iterated in response to an iteration count of the higher priority loop being less than an iteration count of the lower priority loop.

12. The loop scheduling method of claim 11, further comprising:
scheduling, using the processor, an instruction to store intermediate data of the lower priority loop after the higher priority loop is iterated.

13. The loop scheduling method of claim 1, wherein the execution units are included in a coarse-grained reconfigurable array (CGRA) processor or a very long instruction word (VLIW) processor.

14. The loop scheduling method of claim 1, wherein the execution units comprise:

a scalar functional unit (FU) configured to process a scalar data operation;

a pack/unpack FU configured to process a conversion between scalar data and vector data;

a vector load/store FU configured to process loading and storing of vector data; and a vector FU configured to process an operation on vector data.

15. A non-transitory computer-readable storage medium storing a program for loop scheduling, the program comprising instructions configured to cause a computer to perform the loop scheduling method of claim 1.

16. A loop scheduling method comprising:
   scheduling, using a processor, a first loop using execution units; and
   scheduling, using the processor, a second loop using execution units available as a result of the scheduling of the first loop,
   wherein the scheduling of the second loop comprises restricting, using predication guarding, an execution of the second loop after the second loop is iterated in response to an iteration count of the first loop being greater than an iteration count of the second loop.

17. The loop scheduling method of claim 16, wherein the scheduling of the second loop comprises scheduling at least a portion of the second loop using execution units yet to be assigned to the first loop in cycles for which the first loop is scheduled.

18. The loop scheduling method of claim 16, further comprising:
   selecting, using the processor, two independent loops from among loops included in source code; and
   determining, using the processor, a selected loop that enables a number of the available execution units to increase to be the first loop, and determining, using the processor, a remaining selected loop to be the second loop.

19. The loop scheduling method of claim 16, wherein a priority of the first loop is higher than a priority of the second loop, and a priority of a loop is calculated based on at least one of an iteration count of the loop and a number of cycles for a single iteration of the loop.

20. The loop scheduling method of claim 16, wherein the scheduling of the second loop comprises assigning instructions to the available execution units in cycles for which the first loop is scheduled, based on a data dependency among the instructions included in the second loop.

21. The loop scheduling method of claim 16, wherein the scheduling of the second loop comprises:
   determining an execution unit to be used to schedule the second loop; and
   verifying whether the determined execution unit is available in a cycle for which the second loop is scheduled.

22. The loop scheduling method of claim 16, wherein the scheduling of the first loop comprises assigning instructions to the execution units in cycles, based on a data dependency among the instructions included in the first loop.

23. The loop scheduling method of claim 16, further comprising:
   unrolling, using the processor, a result of the scheduling of the first loop in response to the second loop not being scheduled using the available execution units as a result of the scheduling of the first loop; and
   scheduling, using the processor, the second loop using execution units available as the unrolled result of the scheduling of the first loop.

24. The loop scheduling method of claim 23, wherein the unrolling comprises determining whether the result of the scheduling of the first loop is to be unrolled, based on at least one of a threshold value for an unrolling count and a threshold value for a number of cycles of the unrolled result of the scheduling of the first loop.

25. The loop scheduling method of claim 16, further comprising:
   scheduling, using the processor, the second loop to iterate a remaining portion of the second loop after the first loop is iterated, in response to an iteration count of the first loop being less than an iteration count of the second loop.

26. The loop scheduling method of claim 25, further comprising:
   scheduling, using the processor, an instruction to store intermediate data of the second loop after the first loop is iterated.

27. A controller comprising:
   a selecting processor configured to select independent loops from among loops included in source code;
   a detecting processor configured to determine, among the selected independent loops, a first loop having a higher priority and a second loop having a lower priority;
   a scheduling processor configured to schedule the first loop using execution units and to schedule the second loop using execution units available as a result of the scheduling of the first loop, wherein the scheduling processor is further configured to schedule the second loop to iterate a remaining portion of the second loop in response to an iteration count of the first loop being less than an iteration count of the second loop; and
   a generating processor configured to generate an object code comprising the result of the scheduling of the first loop and a result of the scheduling of the second loop.

28. The controller of claim 27, wherein the scheduling of the second loop comprises scheduling at least a portion of the second loop using execution units yet to be assigned to the first loop, in cycles for which the first loop is scheduled.

29. The controller of claim 27, wherein the determining comprises calculating a priority of the first loop and a priority of the second loop, and wherein a priority of a loop is calculated based on at least one of an iteration count of the loop and a number of cycles for a single iteration of the loop.

30. The controller of claim 27, wherein the scheduling of the second loop comprises mapping a data flow graph (DFG) of the second loop to execution units available in cycles for which the second loop is scheduled.

31. The controller of claim 27, wherein the scheduling of the second loop comprises:
   determining an execution unit to be used to schedule the second loop; and
   verifying whether the determined execution unit is available in a cycle for which the second loop is scheduled.

32. The controller of claim 27, wherein the scheduling of the first loop comprises scheduling a data flow graph (DFG) of the first loop to the execution units in cycles.

33. The controller of claim 27, wherein the scheduling processor is further configured to:
   unroll a result of the scheduling of the second loop in response to the second loop not being scheduled using the available execution units as a result of the scheduling of the first loop; and
   schedule the second loop using execution units available as the unrolled result of the scheduling of the second loop.

34. The controller of claim 27, wherein the scheduling of the second loop comprises restricting, using predication guarding, an execution of the second loop after the second loop is iterated in response to an iteration count of the first loop being greater than an iteration count of the second loop.

* * * * *